(12) United States Patent
Ahmad et al.

(10) Patent No.: US 10,795,715 B2
(45) Date of Patent: Oct. 6, 2020

(54) CLOUD OVERSUBSCRIPTION SYSTEM

(71) Applicant: AT&T Intellectual Property I, L.P., Atlanta, GA (US)

(72) Inventors: Imad Ahmad, San Ramon, CA (US); Frederick M. Armanino, Milton, GA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 72 days.

(21) Appl. No.: 16/021,739

(22) Filed: Jun. 28, 2018

(65) Prior Publication Data

US 2020/0004601 A1 Jan. 2, 2020

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/45533* (2013.01);
(Continued)

(58) Field of Classification Search
CPC ...... G06F 11/00; G06F 11/07; G06F 11/0703; G06F 11/0712; G06F 11/0766;
(Continued)

(56) References Cited

U.S. PATENT DOCUMENTS 8,631,099 B2 1/2014 Morgan
8,839,042 B2 9/2014 Bromley et al.
(Continued)

*Primary Examiner* — Charles M Swift
(74) *Attorney, Agent, or Firm* — BakerHostetler

(57) ABSTRACT

A cloud oversubscription system comprising an overload detector configured to model a time series of data of at least one virtual machine on a host as a vector-valued stochastic process including at least one model parameter, the overload detector communicating with an inventory database, the overload detector configured to obtain an availability requirement for each of the at least one virtual machine; a model parameter estimator communicating with the overload detector, the model parameter estimator communicating with a database containing resource measurement data for at least one virtual machine on a host at a selected time interval, the model parameter estimator is configured to estimate the at least one model parameter from the resource measurement data; a loading assessment module communicating with the model parameter module to obtain the at least one model parameter for each of the at least one host running at least one virtual machine and determine a probability of overload based on the at least one model parameter, wherein the loading assessment module communicates the probability of overload to the overload detector; wherein the overload detector compares the probability of overload to the availability requirement to identify a probable overload condition value; and wherein the overload detector communicates the probable overload condition value to a recommender, wherein the recommender generates an alert when the overload condition value exceeds the service level agreement requirements for any of the at least one virtual machine.

18 Claims, 19 Drawing Sheets

(51) Int. Cl.
　　　*G06F 9/50*　　　(2006.01)
　　　*G06F 11/00*　　(2006.01)
　　　*G06F 11/07*　　(2006.01)
　　　*G06F 11/30*　　(2006.01)
　　　*G06N 7/08*　　　(2006.01)
　　　*G06F 17/18*　　(2006.01)
　　　*H04L 12/24*　　(2006.01)

(52) U.S. Cl.
　　　CPC ............ *G06F 9/48* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/505* (2013.01); *G06F 9/5005* (2013.01); *G06F 9/5027* (2013.01); *G06F 9/5083* (2013.01); *G06F 11/00* (2013.01); *G06F 11/008* (2013.01); *G06F 11/07* (2013.01); *G06F 11/0703* (2013.01); *G06F 11/0712* (2013.01); *G06F 11/0766* (2013.01); *G06F 11/30* (2013.01); *G06F 11/301* (2013.01); *G06F 11/3003* (2013.01); *G06F 17/18* (2013.01); *G06N 7/08* (2013.01); *H04L 41/5009* (2013.01); *G06F 2009/4557* (2013.01); *G06F 2009/45591* (2013.01)

(58) Field of Classification Search
　　　CPC .... G06F 11/30; G06F 11/3003; G06F 11/301; G06F 9/455; G06F 9/45533; G06F 9/45558; G06F 2009/45591; G06F 9/48; G06F 9/4806; G06F 9/4843; G06F 9/4881; G06F 9/50; G06F 9/5005; G06F 9/5027; G06F 9/505
　　　See application file for complete search history.

(56) References Cited

U.S. PATENT DOCUMENTS

| | | |
|---|---|---|
| 9,184,982 B2 | 11/2015 | Gupta et al. |
| 9,363,190 B2 | 6/2016 | Beloglazov et al. |
| 9,405,572 B2 | 8/2016 | Breitgand et al. |
| 9,454,408 B2 | 9/2016 | Dutta et al. |
| 9,817,690 B2 | 11/2017 | Feng et al. |
| 9,934,059 B2 | 4/2018 | Alicherry et al. |
| 2010/0169253 A1* | 7/2010 | Tan ................ G06F 9/5088 706/21 |
| 2010/0333089 A1* | 12/2010 | Talwar ............. G06F 11/004 718/1 |
| 2011/0173329 A1* | 7/2011 | Zhang ............... G06F 1/3206 709/226 |
| 2015/0052250 A1* | 2/2015 | Doganata ........... G06F 9/5083 709/226 |
| 2015/0121160 A1* | 4/2015 | Baone .............. G06Q 50/06 714/746 |
| 2015/0143364 A1* | 5/2015 | Anderson .......... G06F 9/5088 718/1 |
| 2015/0143367 A1 | 5/2015 | Jia et al. |
| 2016/0112275 A1* | 4/2016 | Park ................ H04L 41/0896 709/224 |
| 2017/0149687 A1 | 5/2017 | Udupi et al. |
| 2019/0130327 A1* | 5/2019 | Carpenter ........... H04L 43/08 |
| 2019/0213027 A1* | 7/2019 | Bhandari ........... G06F 9/5077 |

* cited by examiner

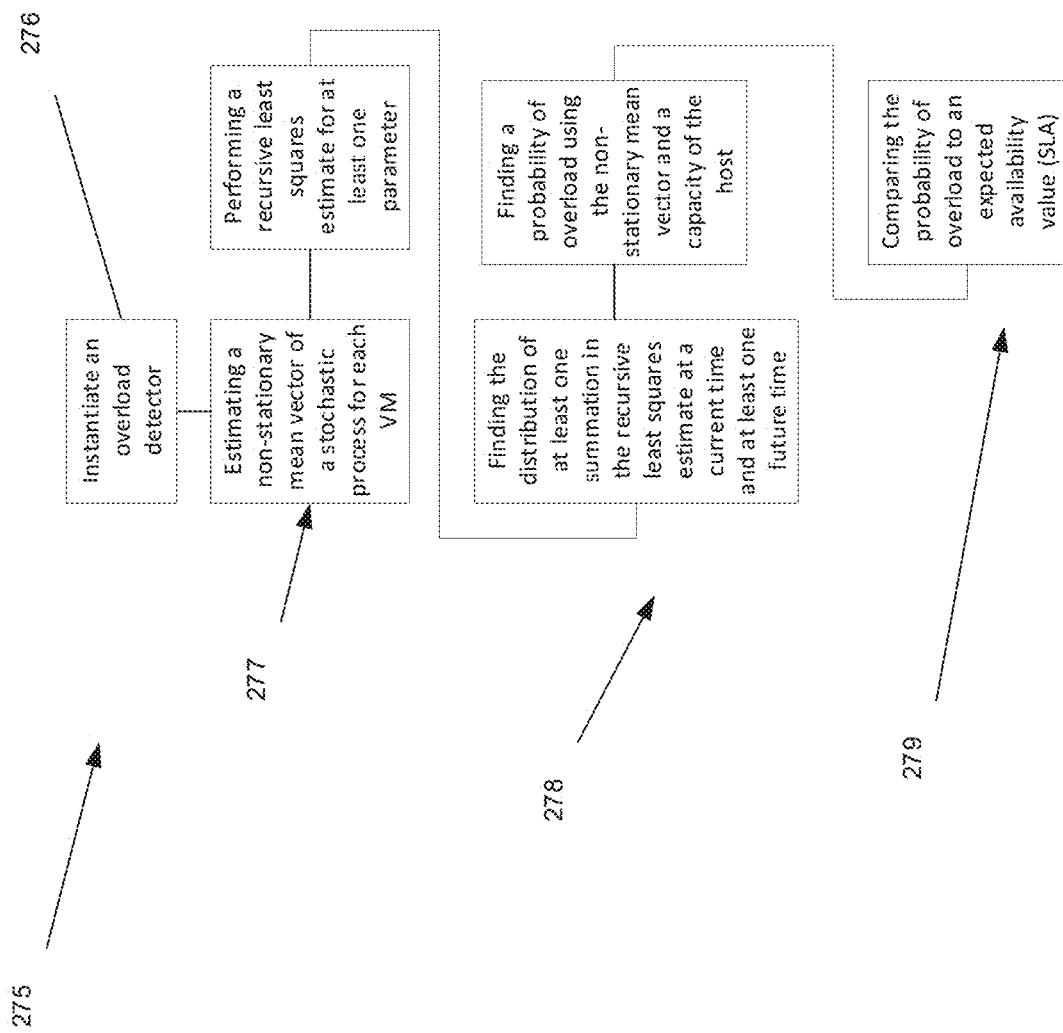

| VM_NAME | vCPUS_NUM | $\hat{\alpha}$ | $\hat{\beta}$ |
|---|---|---|---|
| API-NPE4-CASS2-EWR2 | 4 | 0.000581049 | 0.087045111 |
| BF-GPROD2-GRIDCASS5-EWR2 | 8 | 0.038865598 | 5.997012037 |
| BF-GRID4-GRIDCASS2-EWR2 | 8 | 0.000142814 | 0.045859566 |
| BF-NPE16-JUMP1-EWR2 | 2 | -0.00024029 | 0.056709018 |
| BIO-CASSANDRA4-EWR2-PROD | 8 | -1.62E-05 | 0.070649127 |
| BIO-TOMCAT1-EWR2-PROD | 4 | -1.73E-05 | 0.006785835 |
| EWR2-T-X4-TOOLS1 | 4 | 5.62E-05 | 0.039133945 |
| EWR2PRD1014WT | 8 | 4.41E-06 | 0.022763923 |
| EWR2PRD1090WT | 8 | 0.002524229 | 0.117509616 |
| EWR2PRD1112WT | 8 | 0.002242573 | 0.127057346 |
| OAUTH-NPE13-HAPROXY1-EWR2 | 2 | -1.96E-05 | 0.022304961 |
| OAUTH-NPE5-HAPROXY2-EWR2 | 2 | -0.000236627 | 0.024284152 |
| SPEECH-ALPHA-SERVICES-2C65A92A-A130-4546-BC49-A9C8DB85208E | 8 | 7.55E-07 | 0.0020541 |
| TEST-VM40 | 4 | 1.60E-07 | 0.002563307 |
| Sum | 78 | 0.043887653 | 6.621732055 |

FIG. 11A

| VM_NAME_1 | VM_NAME_2 | COVARIANCE |
|---|---|---|
| API-NPE4-CASS2-EWR2 | API-NPE4-CASS2-EWR2 | 3.66E-05 |
| API-NPE4-CASS2-EWR2 | BF-GPROD2-GRIDCASS5-EWR2 | -0.000662419 |
| API-NPE4-CASS2-EWR2 | BF-GRID4-GRIDCASS2-EWR2 | -1.86E-06 |
| API-NPE4-CASS2-EWR2 | BF-NPE16-JUMP1-EWR2 | 4.94E-06 |
| API-NPE4-CASS2-EWR2 | BIO-CASSANDRA4-EWR2-PROD | 1.91E-07 |
| API-NPE4-CASS2-EWR2 | BIO-TOMCAT1-EWR2-PROD | 8.29E-07 |
| API-NPE4-CASS2-EWR2 | EWR2-T-X4-TOOLS1 | 2.66E-06 |
| API-NPE4-CASS2-EWR2 | EWR2PRD1014WT | -1.31E-08 |
| API-NPE4-CASS2-EWR2 | EWR2PRD1090WT | 4.94E-05 |
| API-NPE4-CASS2-EWR2 | EWR2PRD1112WT | 5.47E-05 |
| API-NPE4-CASS2-EWR2 | OAUTH-NPE13-HAPROXY1-EWR2 | 4.92E-08 |
| API-NPE4-CASS2-EWR2 | OAUTH-NPE5-HAPROXY2-EWR2 | 4.41E-07 |
| API-NPE4-CASS2-EWR2 | SPEECH-ALPHA-SERVICES-2C65A92A-A130-4546-BC49-A9C8DB85208E | -3.82E-08 |
| API-NPE4-CASS2-EWR2 | TEST-VM40 | -4.28E-08 |
| BF-GPROD2-GRIDCASS5-EWR2 | API-NPE4-CASS2-EWR2 | -0.000662419 |
| BF-GPROD2-GRIDCASS5-EWR2 | BF-GPROD2-GRIDCASS5-EWR2 | 11.59464872 |
| BF-GPROD2-GRIDCASS5-EWR2 | BF-GRID4-GRIDCASS2-EWR2 | 0.082638792 |
| BF-GPROD2-GRIDCASS5-EWR2 | BF-NPE16-JUMP1-EWR2 | -0.174838038 |
| BF-GPROD2-GRIDCASS5-EWR2 | BIO-CASSANDRA4-EWR2-PROD | 0.119049996 |
| BF-GPROD2-GRIDCASS5-EWR2 | BIO-TOMCAT1-EWR2-PROD | 3.59E-05 |
| BF-GPROD2-GRIDCASS5-EWR2 | EWR2-T-X4-TOOLS1 | -0.000139502 |
| BF-GPROD2-GRIDCASS5-EWR2 | EWR2PRD1014WT | 0.038709831 |
| BF-GPROD2-GRIDCASS5-EWR2 | EWR2PRD1090WT | 0.283675709 |
| BF-GPROD2-GRIDCASS5-EWR2 | EWR2PRD1112WT | 0.289942373 |
| BF-GPROD2-GRIDCASS5-EWR2 | OAUTH-NPE13-HAPROXY1-EWR2 | -0.074139851 |
| BF-GPROD2-GRIDCASS5-EWR2 | OAUTH-NPE5-HAPROXY2-EWR2 | -0.064939493 |
| BF-GPROD2-GRIDCASS5-EWR2 | SPEECH-ALPHA-SERVICES-2C65A92A-A130-4546-BC49-A9C8DB85208E | 0.003506763 |
| BF-GPROD2-GRIDCASS5-EWR2 | TEST-VM40 | 3.38E-06 |

FIG. 11B

| VM_NAME | vCPUS_NUM | $\hat{\alpha}$ | $\hat{\beta}$ |
|---|---|---|---|
| AC-PROD-NAGIOS1-EWR2 | 8 | 0.000361 | 0.30569 |
| API-NPE3-PGSQL1-EWR2 | 8 | -0.00027 | 0.112609 |
| BF-NPE12-MGMTLB2-EWR2 | 4 | -1.25E-05 | 0.021061 |
| BF-NPE22-JUMP1-EWR2 | 2 | 7.19E-06 | 0.014598 |
| BF-NPE5-MGMTLB1-EWR2 | 4 | -1.27E-05 | 0.015756 |
| DIGITAL-MDC-VPN1-EWR2-PROD | 2 | -5.59E-07 | 0.001749 |
| EASYREMOTE-EPG01-EWR2-PROD | 4 | -3.65E-05 | 0.067783 |
| EWR2-P-P1-APIMATRIX1 | 4 | 7.31E-06 | 0.03174 |
| EWR2-T-D1-TOOLS1 | 4 | 6.15E-05 | 0.045434 |
| EWR21-0 | 1 | -7.12E-05 | 0.588569 |
| EWR2PRD1054WT | 8 | 0.002414 | 0.131647 |
| EWR2PRD1067WT | 8 | 0.002689 | 0.128048 |
| IVEE-VPN01-EWR2-PROD | 2 | -1.24E-06 | 0.001677 |
| SPEECH-ALPHA-SERVICES-6ECCC086-AC56-42A8-AB64-399960111713 | 8 | -1.05E-06 | 0.002695 |
| Sum | 85 | 0.005006 | 1.551357 |

FIG. 11C

| VM_NAME_1 | VM_NAME_2 | COVARIANCE |
|---|---|---|
| AC-PROD-NAGIOS1-EWR2 | AC-PROD-NAGIOS1-EWR2 | 0.024667706 |
| AC-PROD-NAGIOS1-EWR2 | API-NPE3-PGSQL1-EWR2 | 0.008378158 |
| AC-PROD-NAGIOS1-EWR2 | BF-NPE12-MGMTLB2-EWR2 | 1.65E-07 |
| AC-PROD-NAGIOS1-EWR2 | BF-NPE22-JUMP1-EWR2 | -0.002305138 |
| AC-PROD-NAGIOS1-EWR2 | BF-NPE5-MGMTLB1-EWR2 | 1.11E-06 |
| AC-PROD-NAGIOS1-EWR2 | DIGITAL-MDC-VPN1-EWR2-PROD | -0.000272304 |
| AC-PROD-NAGIOS1-EWR2 | EASYREMOTE-EPG01-EWR2-PROD | -4.71E-06 |
| AC-PROD-NAGIOS1-EWR2 | EWR2-P-P1-APIMATRIX1 | 4.07E-05 |
| AC-PROD-NAGIOS1-EWR2 | EWR2-T-D1-TOOLS1 | 5.47E-06 |
| AC-PROD-NAGIOS1-EWR2 | EWR21-0 | -0.274957964 |
| AC-PROD-NAGIOS1-EWR2 | EWR2PRD1054WT | 0.014444661 |
| AC-PROD-NAGIOS1-EWR2 | EWR2PRD1067WT | 0.014623164 |
| AC-PROD-NAGIOS1-EWR2 | IVEE-VPN01-EWR2-PROD | -0.000258378 |
| AC-PROD-NAGIOS1-EWR2 | SPEECH-ALPHA-SERVICES-6ECCC086-AC56-42A8-AB64-39996O111713 | 0.000208878 |
| AC-PROD-NAGIOS1-EWR2 | SPEECH-CHEF1-EWR2-PROD | 0.00482426 |
| AC-PROD-NAGIOS1-EWR2 | WMSSP-ASR1-EWR2-PROD | -8.36E-06 |
| AC-PROD-NAGIOS1-EWR2 | WMSSP-NGINX2-EWR2-SIT | -0.000407022 |
| AC-PROD-NAGIOS1-EWR2 | ZLXCEWR2N13KJMP01 | 1.34E-06 |
| API-NPE3-PGSQL1-EWR2 | AC-PROD-NAGIOS1-EWR2 | 0.008378158 |
| API-NPE3-PGSQL1-EWR2 | API-NPE3-PGSQL1-EWR2 | 0.00287569 |
| API-NPE3-PGSQL1-EWR2 | BF-NPE12-MGMTLB2-EWR2 | 2.78E-08 |
| API-NPE3-PGSQL1-EWR2 | BF-NPE22-JUMP1-EWR2 | -0.000789856 |
| API-NPE3-PGSQL1-EWR2 | BF-NPE5-MGMTLB1-EWR2 | -7.12E-08 |
| API-NPE3-PGSQL1-EWR2 | DIGITAL-MDC-VPN1-EWR2-PROD | -9.31E-05 |
| API-NPE3-PGSQL1-EWR2 | EASYREMOTE-EPG01-EWR2-PROD | -3.25E-07 |
| API-NPE3-PGSQL1-EWR2 | EWR2-P-P1-APIMATRIX1 | 3.68E-06 |
| API-NPE3-PGSQL1-EWR2 | EWR2-T-D1-TOOLS1 | -9.33E-07 |
| API-NPE3-PGSQL1-EWR2 | EWR21-0 | -0.094451751 |
| API-NPE3-PGSQL1-EWR2 | EWR2PRD1054WT | 0.004818411 |
| API-NPE3-PGSQL1-EWR2 | EWR2PRD1067WT | 0.004864889 |
| API-NPE3-PGSQL1-EWR2 | IVEE-VPN01-EWR2-PROD | -8.86E-05 |
| API-NPE3-PGSQL1-EWR2 | SPEECH-ALPHA-SERVICES-6ECCC086-AC56-42A8-AB64-39996O111713 | 7.16E-05 |
| API-NPE3-PGSQL1-EWR2 | SPEECH-CHEF1-EWR2-PROD | 0.001650583 |
| API-NPE3-PGSQL1-EWR2 | WMSSP-ASR1-EWR2-PROD | -1.24E-07 |
| API-NPE3-PGSQL1-EWR2 | WMSSP-NGINX2-EWR2-SIT | -0.000137008 |
| API-NPE3-PGSQL1-EWR2 | ZLXCEWR2N13KJMP01 | 2.98E-07 |

FIG. 11D

| Host | Current | In 1 month | In 2 months | In 3 months | In 6 months | In 12 months |
|---|---|---|---|---|---|---|
| ewr2r26c018.ewr2.cci.att.com | 0.0 | 0.0 | 4.441e-16 | 1.302e-13 | 8.953e-06 | 0.58532 |
| ewr2r23c013.ewr2.cci.att.com | 0.0 | 0.0 | 0.0 | 0.0 | 0.0 | 0.0 |

FIG. 11E

CLOUD OVERSUBSCRIPTION SYSTEM

TECHNICAL FIELD

The invention relates to networked resources, and more particularly to a cloud oversubscription system that analyzes overloading of hosted virtual machines on an individual basis to detect a probability of overload of a host. Most particularly, the system relates to a cloud oversubscription system that includes a model that analyzes loading of hosted virtual machines, and a recommender that uses the model to identify an action to resolve or prevent an excessive overload condition.

BACKGROUND

Cloud service providers often oversubscribe their cloud environment to operate at high resource efficiency. This is typically performed by allocating resources to virtual machines on a physical host (e.g. server) that exceeds the capacity of that given host. The concept of oversubscription has been utilized for decades by service providers to operate at higher overall resource utilization. The same concept is being utilized for the cloud environment with the key enablers for oversubscription being: virtual machines may not utilize or grow-to-utilize their requested resources (e.g. VCPUs), and virtual machines typically present different resource utilization patterns/behaviors, e.g., different peak times. Currently, cloud service providers utilize the traditional method of overload forecasting to prepare for an overload scenario. This method only considers the aggregate history of resource utilization of a physical host in the environment. This method, however, does not account for the elasticity of a cloud environment where virtual machines enter and exit the environment. As a result, the traditional method is a poor predictor. Alternative methods employ heuristics to terminate or migrate a virtual machine to resolve an overload issue. While this method may address an existing oversubscription issue, it does not provide a good prediction of future oversubscription to address issues before they occur. This disclosure is directed to solving one or more of the problems in the existing technology.

SUMMARY

According to an example, the disclosure relates generally to a cloud oversubscription system comprising: an overload detector configured to model a time series of data of at least one virtual machine on a host as a vector-valued stochastic process including at least one model parameter, the overload detector communicating with an inventory database, the overload detector configured to obtain an availability requirement for each of the at least one virtual machine; a model parameter estimator communicating with the overload detector, the model parameter estimator communicating with a database containing resource measurement data for at least one virtual machine on a host at a selected time interval, the model parameter estimator is configured to estimate the at least one model parameter from the resource measurement data; a loading assessment module communicating with the model parameter module to obtain the at least one model parameter for each of the at least one host running at least one virtual machine and determine a probability of overload based on the at least one model parameter, wherein the loading assessment module communicates the probability of overload to the overload detector; wherein the overload detector compares the probability of overload to the availability requirement to identify a probable overload condition value; and wherein the overload detector communicates the probable overload condition value to a recommender, wherein the recommender generates an alert when the overload condition value exceeds the service level agreement requirements for any of the at least one virtual machine.

Another example includes a method for determining an overload condition for a host in a cloud computing environment, the method comprising: measuring a loading value of a virtual machine assigned to a host; periodically storing the loading value in a database; performing a recursive parameter estimation including at least one summation using the loading values within the database; updating the at least one summation at a selective time interval and storing a value of the at least one summation at each selective time interval estimating a probability of overload by: a) finding the distribution of the at least one summation at a current time and at least one future time, b) finding the probability of overload using estimated model parameters of vector valued-stochastic process model and a capacity of the physical host; comparing the probability of overload to an expected availability value; and recommending an action to take if expected availability value is violated.

Still another example includes a network device comprising a process, a memory coupled with the processor, and an input/output device, the memory comprising executable instructions that when executed by the processor cause the processor to effectuate operations comprising: obtaining a resource measurement data for each virtual machine on the host at a selected time interval and estimating the at least one model parameter from the resource measurement data; determining a probability of overload based on the at least one model parameter for each of the at least one host; obtaining an availability requirement and comparing the probability of overload to the availability requirement; and taking an action when the probability of overload violates the availability requirement.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 2A is a flow diagram depicting operation of a system according to an example.

FIG. 11A-D are tables depicting experimentally obtained results.

FIG. 11E is a table depicting a probability of overload from the experimentally obtained results calculated at various times.

DETAILED DESCRIPTION

A cloud oversubscription system is generally indicated by the number 200 in the accompanying drawings. The system 200 models current and future probability of overload of physical hosts in a cloud environment, and includes a recommender that provides actions informed by the model to address current or future overload conditions. While applicable to a variety of networks including those in the examples depicted in FIGS. 4-10, system 200 is described in the context of a cloud computing or network function virtualization (NFV) because of the model's suitability to the elastic nature of such environments. In the cloud environment, it is expected that virtual machines (VMs) will be spun up or down at any given time. As discussed more completely below, system 200 may be instantiated as a network device within such a network, as a virtual machine, or a virtual network function on a network.

Figure 1A:
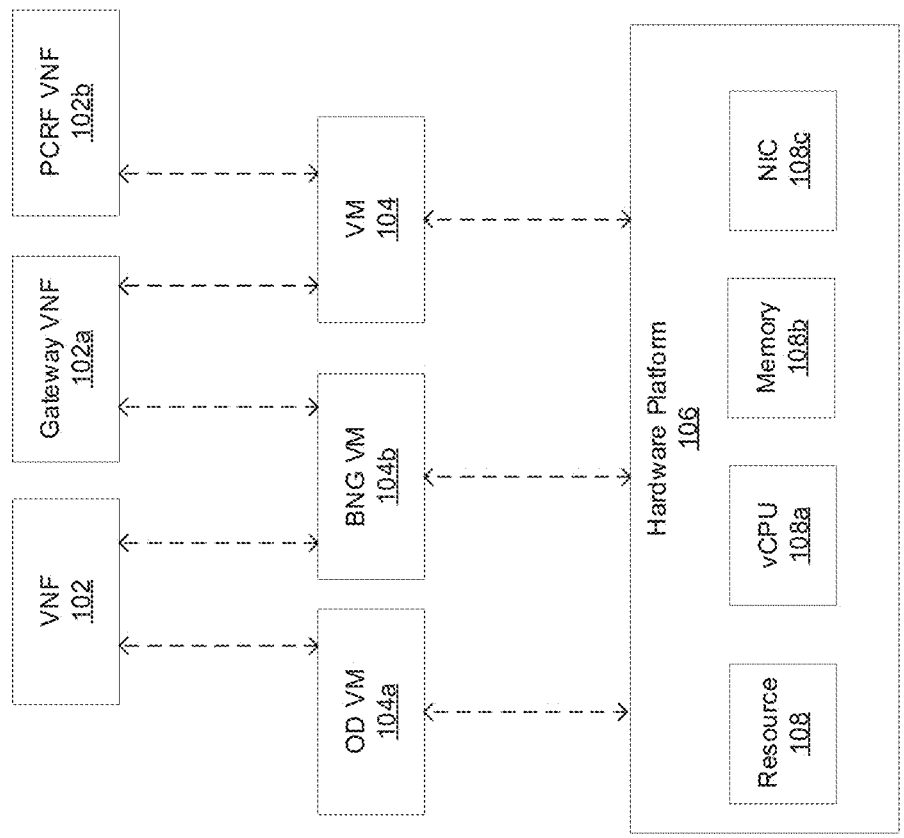
FIG. 1A is a representation of an exemplary network.

FIG. 1A is a representation of an exemplary network 100. Network 100 may comprise a virtualized network—that is, network 100 may include one or more virtualized functions implemented on general purpose hardware, such as in lieu of having dedicated hardware for every network function. General purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1A illustrates a gateway VNF 102a and a policy and charging rules function (PCRF) VNF 102b. Additionally or alternatively, VNFs 102 may include other types of VNFs including but not limited to security, routing, wide area network (WAN) optimization and others within a service providers virtual network offerings. According to the example, VNF 102 may estimate a buffer condition as described more completely below.

Each VNF 102 may use one or more virtual machine (VM) 104 to operate. Each VM 104 may have a VM type that indicates its functionality or role. For example, FIG. 1A illustrates a an overload detector (OD) VM 104a according to an example of system 200. Additionally or alternatively, VM 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
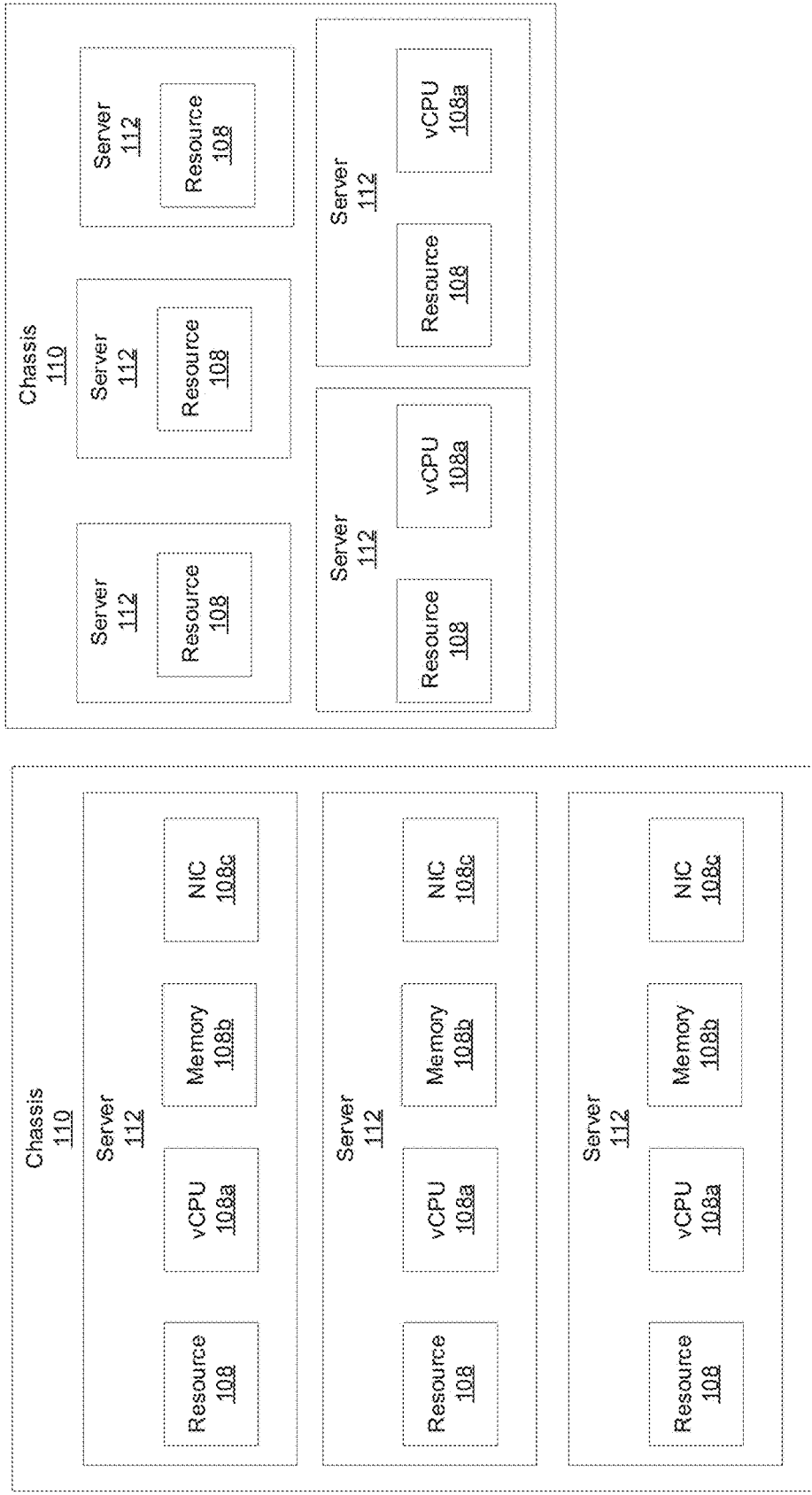
FIG. 1B is a representation of an exemplary hardware platform.

While FIG. 1A illustrates resources 108 as collectively contained in hardware platform 106, the configuration of hardware platform 106 may isolate, for example, certain memory 108c from other memory 108a. FIG. 1B provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together in any combination or arrangement.

The characteristics of each chassis 110 and each server 112 may differ. For example, FIG. 1B illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Figure 2:
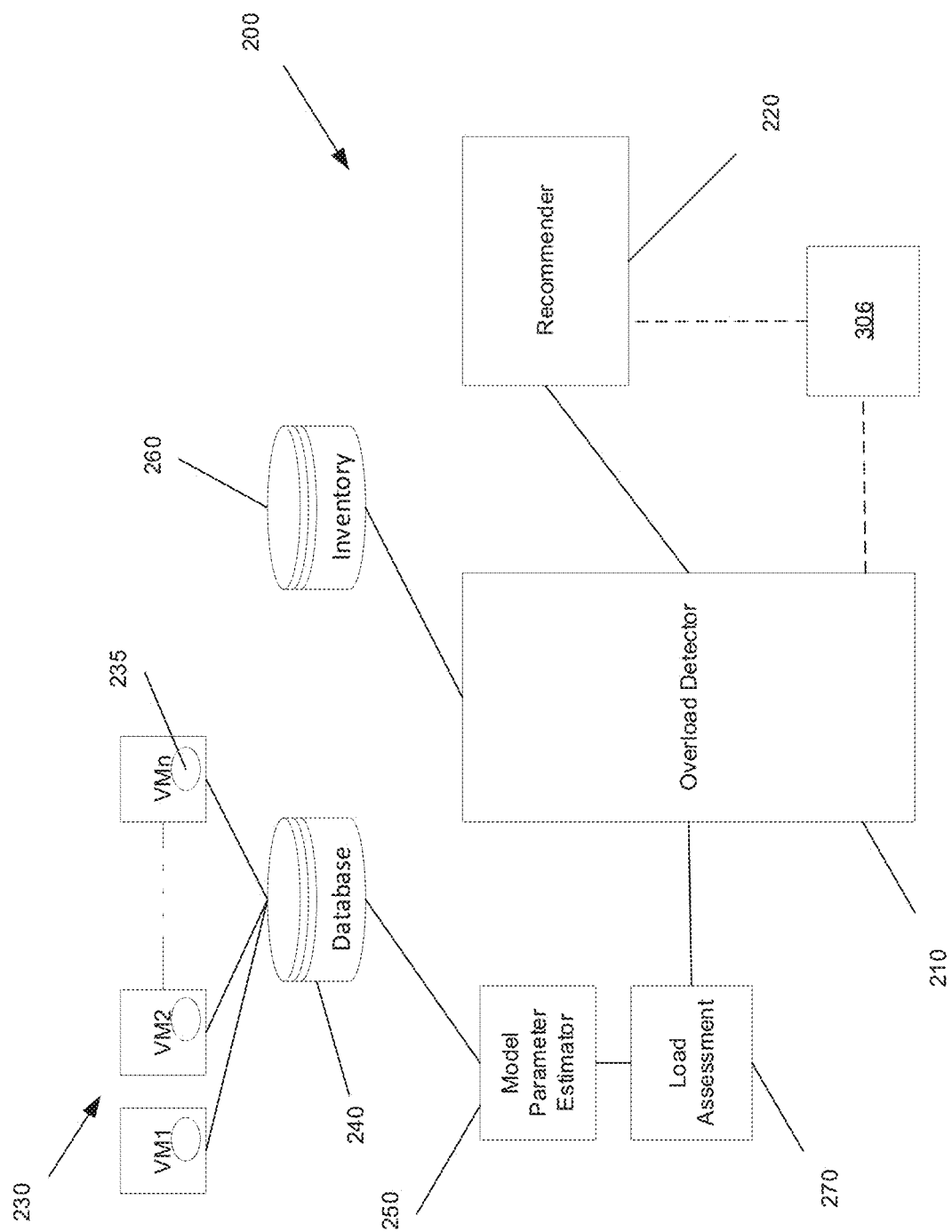
FIG. 2 is a representation of a data and context based role management system according to an example.

FIG. 2 shows a representation of a cloud oversubscription system 200 according to an example of the disclosure. A cloud oversubscription system 200 generally includes an overload detector 210 and a recommender 220. System 200 communicates with a network 100 that includes plural VMs hosted on physical resources, generally indicated by the number 230, in a data center. Physical resources 230 may include a server, memory, display etc. In the example, each VM includes an agent 235 that monitors resource measurements, such as CPU load average, and sends it to a database 240. In the example, agent 235 pulls this data every 5 minutes for each VM, but other time periods and number of VMs may be used.

In the example, the resources have been oversubscribed. As indicated, this is a desirable strategy in the sense of efficient resource usage and allocation. Knowing that the resources are oversubscribed, system 200 is instantiated to monitor the probability of an overload condition. This probability of overload may be considered in the context of a service level agreement (SLA) or other metric for quality and reliability of service. In the example, overload detector 210 communicates with an inventory database, such as an A&AI database in an ECOMP platform to consider the SLAs and priority score for each VM.

Due to the elastic nature of NFV and cloud computing, where VMs are spun up and spin down regularly, aggregate data cannot be used to predict overload. The aggregate data treats all VMs as a unit and, therefore, does not provide a correlation between the utilizations of individual VMs. In the case that a new VM joins the host for example, aggregate historical data on that particular host cannot be utilized anymore to predict probability of overload. More importantly, aggregate data cannot be used to recommend shut down in the case of virtual overload because treating all VMs as a unit prevents consideration of which VM is likely to cause an overload.

To address this deficiency, Overload detector 210 models cloud oversubscription to predict current and future probability of overload of physical hosts (e.g. servers, VCPUs, etc.) in a cloud network 100. The model looks at the multiple time series of data for each VM of a particular host as a vector-valued stochastic process. At each time, model receives a vector, i.e. a collection of measurements. In the example, system 200 includes a model parameter estimator 250. Model parameter estimator 250 uses the vectors for each host to estimate at least one parameter for the model. Model parameter estimator 250 is shown as a separate component or virtual network function within system 200. It will be understood that model parameter estimator 250 may also be incorporated within overload detector 210 or recommender 220.

The model utilized is a Vector Auto Regressive Moving Average (V-ARMA) with-a non-stationary mean (for trend and seasonality) model that models a collection of VM resource measurement (e.g., CPU load) time series as a multivariate stochastic process $\{Xt\}$, where the CPU load at a selected time t (in terms of vCPUs) of VM m is denoted by $Xt^{[m]}$. A fast-to-estimate V-ARMA example is the following At time t, the vector of the collection of measurements of the VMs is modeled as a multivariate normal distribution:

$$X_t \equiv (X_t^{[1]}, X_t^{[2]}, \ldots, X_t^{[M]}) \sim N(\mu_t, \Sigma)$$

where $\mu_t$ is the mean 1×M vector and $\Sigma$ is the M×M covariance matrix. $\mu_t$ is assumed to be deterministic and follows $\mu_t = \alpha t + \beta$. $\Sigma$ is constant with time. The $X_t$'s are assumed to be identically and independently distributed in this special case model of the V-ARMA.

The non-stationary mean parameters of the fast-to-estimate model example above are estimated using a recursive least-squares estimator. The covariance matrix is estimated by de-trending the measurements using the estimated mean and calculating recursively the covariances between the individual VM resource measurements.

A more general example of the V-ARMA with-a-trend model is provided below. At each time instance, the utilization vector depends on the utilization vectors and residual vectors of the previous instances. For example, where Xt is a vector, the estimate involves vector c and d for the trend component combined with a summation of matrices Ai and Bi, where p and q represent the lag, where p is the past measurement value and q is a residual value.

$$X_t = ct + d + \Sigma_{i=1}^{p} A_i X_{t-p} + \Sigma_{t=1}^{q} B_i e_{t-q} + e_t$$

The parameters for the vector Xt may be calculated using existing methods including for example, a Yulk-Walker method.

With reference to FIG. 2, overload detector 210 communicates with an inventory database 260, such as an active and available inventory (A&AI) database in an ECOMP platform. Overload detector 210 includes an input/output device and is configured to pull a list of SLA availability values for all VMs of a host. Overload detector 210 may analyze the list to determine the highest limit or most stringent maximum availability number for a given host. The inventory database 260 includes identification of all of the VMs on a host including the properties and service level requirements (SLA) for each VM. For example, an SLA may indicate an availability requirement of 99.99%. Using the most stringent requirement, the probability value produced by the model is compared to the availability limitation in the SLA.

Overload detector 210 may include or communicate with a loading assessment tool 270. Load assessment tool 270 communicates with the model parameter estimator 250 to obtain the model estimated for each host. The loading assessment tool 270 is configured to determine the probability of overload of least one selected future time $T_f$, in one example, as follows:

$$\Pr(\{\text{overload at } \tau_f\} | \{X_t\}_{t=1}^{\tau_c}, \text{host}) = \Pr(\{X_{\tau_f}^{[1]} + X_{\tau_f}^{[2]} + \ldots + X_{\tau_f}^{[M]} > L\}),$$

where L is the number of LCPUs of the host.

The above probability of overload is determined by the loading assessment tool 270 by finding the distribution of the sum random variable $Y_{t+N} = X_{t+N}^{[1]} + X_{t+N}^{[2]} + \ldots + X_{t+N}^{[M]}$. For example, for the fast-to-estimate model example $$Y_{t+N} \sim N(\Sigma_{i=1}^{M} \mu_{t+N}^{[i]}, \Sigma_{j=1}^{M} \Sigma_{k=1}^{M} \Sigma_{(j,k)}).$$

The loading assessment tool 270 determines a load value expressed as a probability of an overload condition and sends the load value to the overload detector. The overload detector compares the load value to the service level agreement (SLA) or other limitation on availability to identify a probable overload condition value. In one example, the comparison is made with the most stringent availability requirement. Optionally, the comparison may include the probability that a host will be down or unreachable due to a hardware/software failure. The probability of a host being down may be available from inventory database as a statistic on the host. To make the comparison, overload detector 210 may consider whether 1 less the difference between the probability of overload and the probability of a resource being down is less than the maximum availability:

$$1 - \Pr(\text{overload}) - \Pr(\text{down}) < \max\{\text{avail}\}$$

The comparison may be made for any selected time i.e. 1 hour through n hours from a current time. While the examples, refer to a number of hours, other units of time may be considered including for example, 1 day, 30 days or 120 days. If the comparison is true, overload detector 210 may flag an alert. It will be understood that if an overload is indicated at 1 day, it likely will be overload for later time periods such as 30 days or 120 days.

System 200 may also include a recommender, generally indicated by the number 220 that communicates with overload detector 210. When a probability of overload is indicated by overload detector 210, recommender 220 performs an analysis to provide at least one action including but not limited to disabling a VM or migrating the VM to another resource. Recommender 220 identifies the VM that is most likely causing the overload condition, also referred to as the "bad VM" herein. Recommender 220 uses model to iteratively remove each VM from the model and assess the impact on the probability of overload condition. The probability can be calculated to determine which VM causes the greatest change. The VM causing the greatest change is likely the best one to remove or migrate to another host. Recommender 220 would then recommend an action identifying the VM to terminate or migrate. To that end, recommender 220 may generate an action signal that is communicated to an input/output 306 to simply provide a recommended action. Alternatively, recommender 220 may communicate an action signal to automatically terminate or migrate the VM.

Optionally, further analysis may be made to determine the viability of migrating the VM to another physical host. A probability calculation may be made hypothetically moving the bad VM to another host on an iterative basis to identify the probability of overload with each potential migration. The host where the lowest probability of overload or least impact is shown is identified as the recommended host for purposes of migration. The VM may be automatically moved to this host by recommender 220 or recommender 220 may identify the host for migration as part of the action signal delivered to an output. The output may be located at a network administrator or other user monitoring the overload conditions of a network 100.

Overload detector 210 includes a parametric learning algorithm based on a model that captures two main enablers of oversubscription in a cloud environment: virtual machines may not grow to utilize their requested resources and virtual machines typically present different resource utilization patterns/behaviors, i.e. different peak time. The parametric algorithm is designed in a recursive fashion and the recommendation a vector parameter module. With reference to FIG. 2A, system 200 may perform a method of operations, generally indicated at 275, including instantiating the overload detector 210 at 276 as a virtual network function or network device; estimating a non-stationary mean vector of a vector-valued stochastic process for each host at 277. Where the estimating step may include performing a recursive least squares estimate including at least one summation using a loading value stored in a database. The method also includes updating the at least one summation at a selective time interval and storing a value of the at least one summation at each selective time interval and the non-stationary mean vector in a memory for each time interval; calculating a covariance matrix estimate; and estimating a probability of overload by a) finding the distribution of the at least one summation at a current time and at least one future time, b) finding the probability of overload using estimated mean vector and covariance matrix and a capacity of the physical host generally indicated at 278. The probability is then compared to the expected availability value or limit L defined in the SLA at step 279.

Figure 2B:
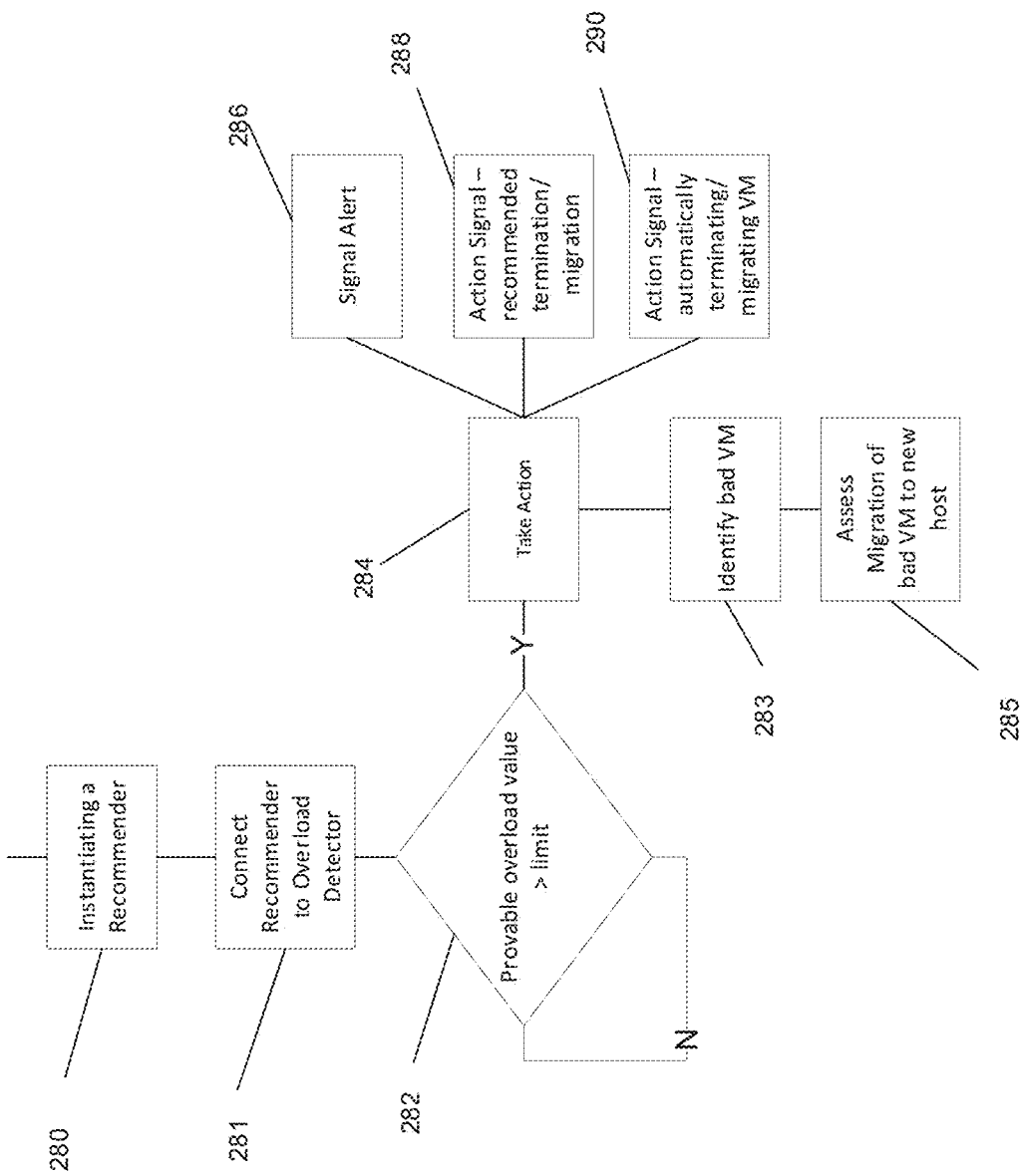
FIG. 2B is a flow diagram depicting further operation of the system according to an example.

With reference to FIG. 2B, method 275 may also include instantiating a recommender 220 at step 280. The recommender 220 is connected to overload detector 210 at 281, and communicates with overload detector 210 as described above. The overload detector communicates the probable overload condition value to a recommender 220. The recommender 220 may generate an alert signal and communicate it via an input/output 306 (FIGS. 2 and 3) if the overload condition value exceeds the service level agreement for any of the at least one virtual machine. Because the overload detector 210 is able to identify a trend from the probable overload condition value allowing an action taken before an actual overload condition occurs.

According to another example, when an overload condition is detected at step 282, the recommender 220 takes an action at 284 including at least one of generating an alert 286; providing a recommended termination or migration plan for a VM 288; or automatically terminating or migrating a bad VM 290. As a preliminary step 283, recommender 220 may identify a "bad VM" that is likely to cause an overload condition or may be the largest contributor to the possible overload. According to an example, recommender picks one VM at a time and removes it from the model to determine the impact of the removal on the probability of overload. In this way, the impact of the VM on the probable overload condition can be considered in the stochastic model. The model considers the maximum difference in probability of overload, probability down and max available for each VM. Once the VM that has the greatest impact is identified, recommender may take action in the form of terminating or shutting down the VM. Alternatively, recommender may consider migrating the VM to another physical host. For example, as a follow up step 285, considering one host at a time, recommender adds the bad VM to the model of each host. Again the model considers the difference of probability overload, probability down and max available. The host that will incur the smallest change in the probability of overload, i.e. the host where adding the VM has the smallest impact, is selected as the desired host for migration.

Figure 3:
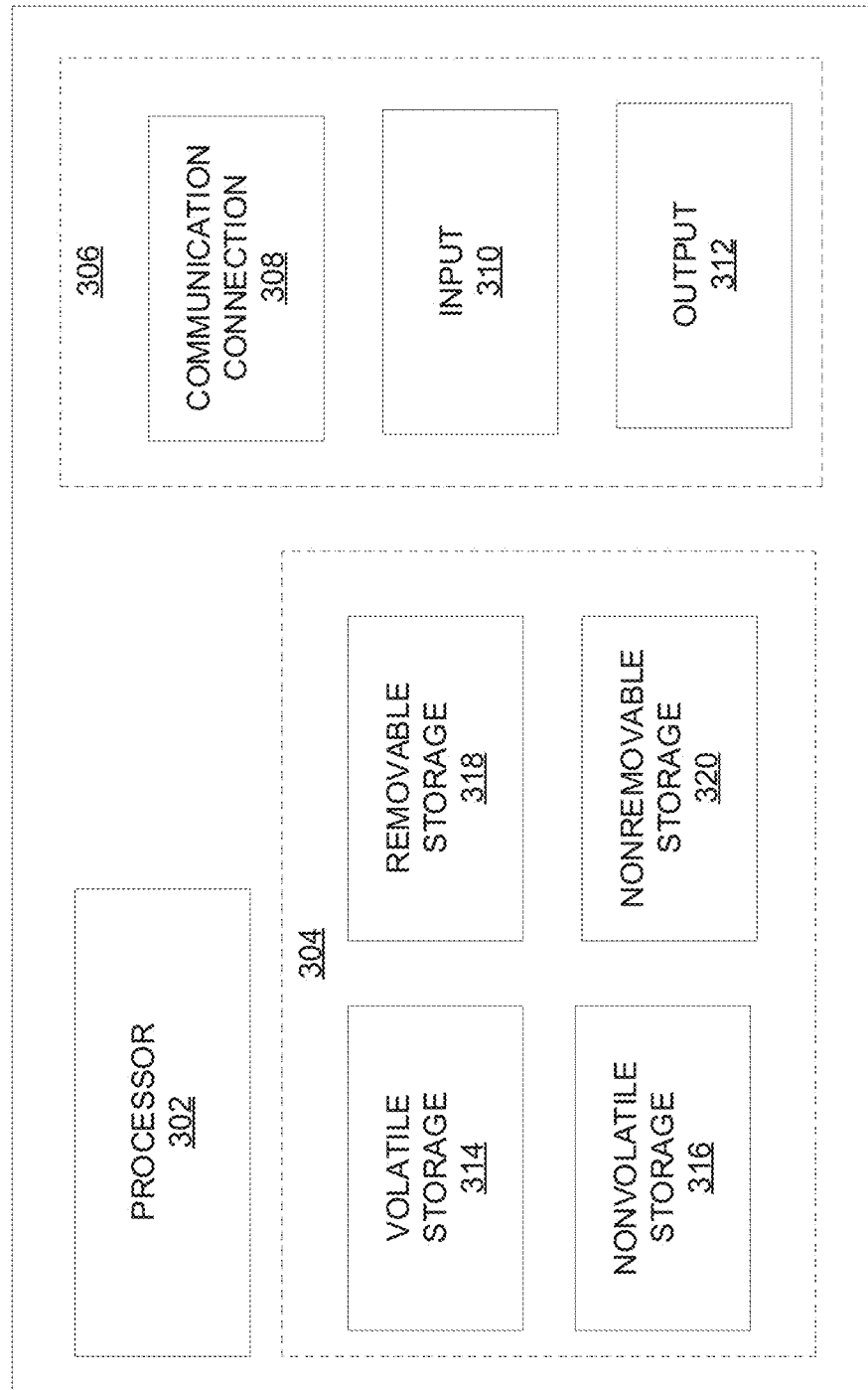
FIG. 3 is a representation of a network device according to an example.

As described above, system 200 and its components including overload detector 210 and recommender 220 may be instantiated as a network device. FIG. 3. illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Overload detection system 200 may reside within or be connected to any network to analyze overload probability of virtual machines connected to or hosted on the network. The following are example networks on which system 200 may reside. For purposes of centrality, system 200 may reside within a core network shown in the various examples below. However, it will be understood that system 200 may reside on any network edge router or network device providing the same function in connection with customer VRFs including but not limited to telecommunications networks, internet, and other networks described more completely below.

Figure 4:
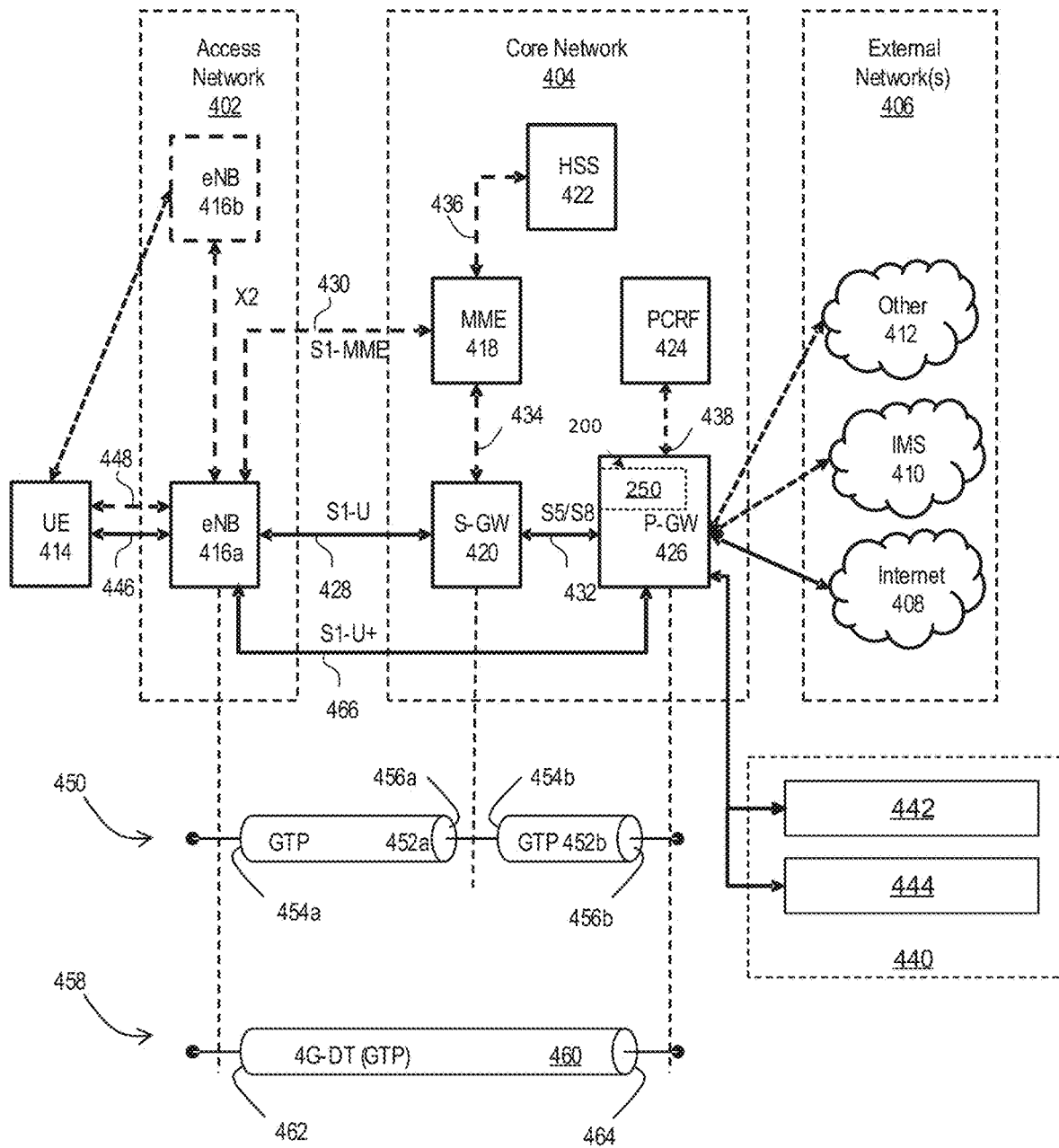
FIG. 4 depicts an exemplary communication system that provide wireless telecommunication services over wireless communication networks that may be at least partially implemented as an SDN.

FIG. 4 illustrates a functional block diagram depicting one example of an LTE-EPS network architecture 400 that may be at least partially implemented as an virtualized network. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452*a* between two tunnel endpoints 454*a* and 456*a*, and a second tunnel 452*b* between two tunnel endpoints 454*b* and 456*b*. In the illustrative example, first tunnel 452*a* is established between eNB 416*a* and SGW 420. Accordingly, first tunnel 452*a* includes a first tunnel endpoint 454*a* corresponding to an S1-U address of eNB 416*a* (referred to herein as the eNB S1-U address), and second tunnel endpoint 456*a* corresponding to an S1-U address of SGW 420 (referred to herein as the SGW S1-U address). Likewise, second tunnel 452*b* includes first tunnel endpoint 454*b* corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416*a* and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. That is, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
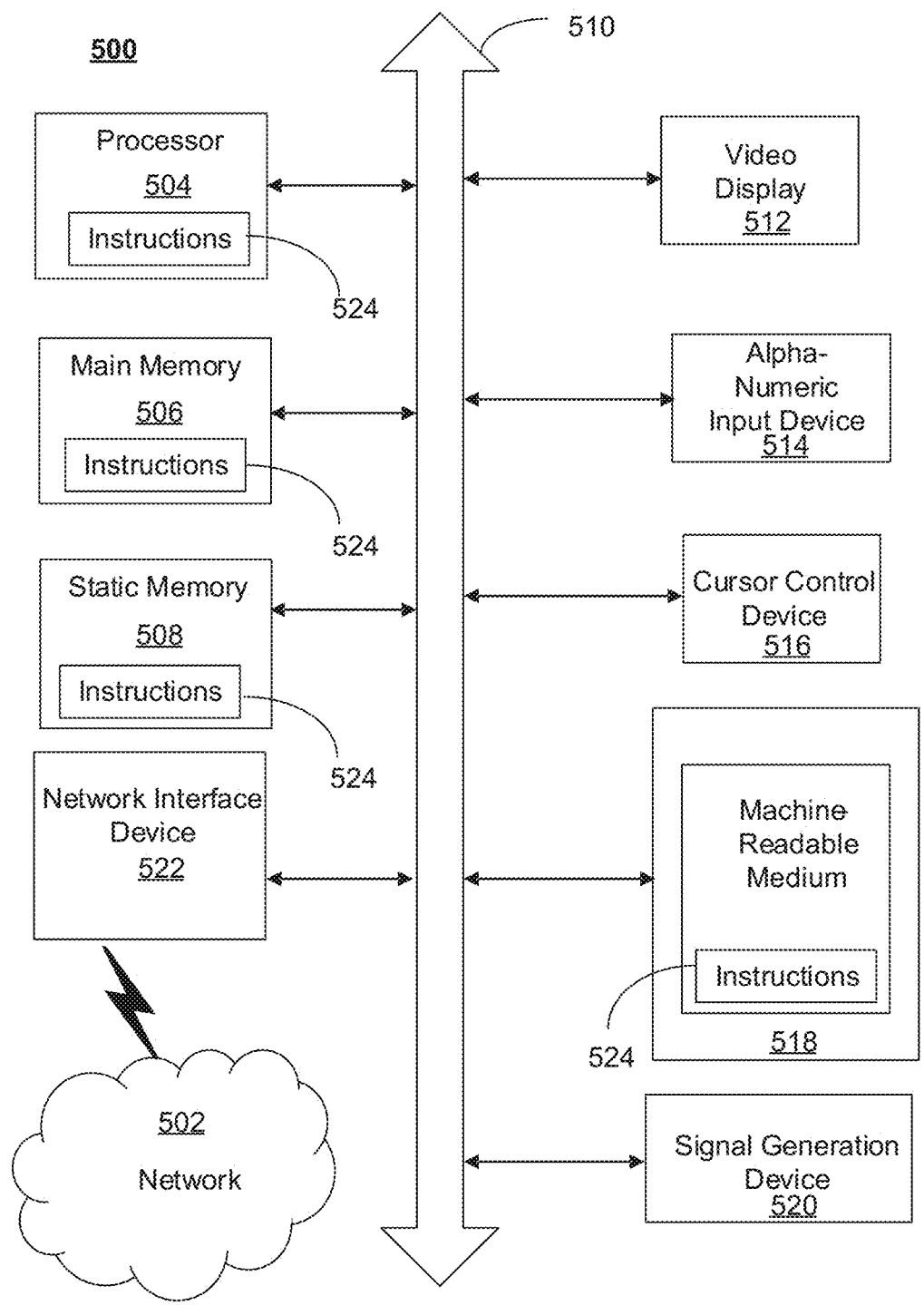
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
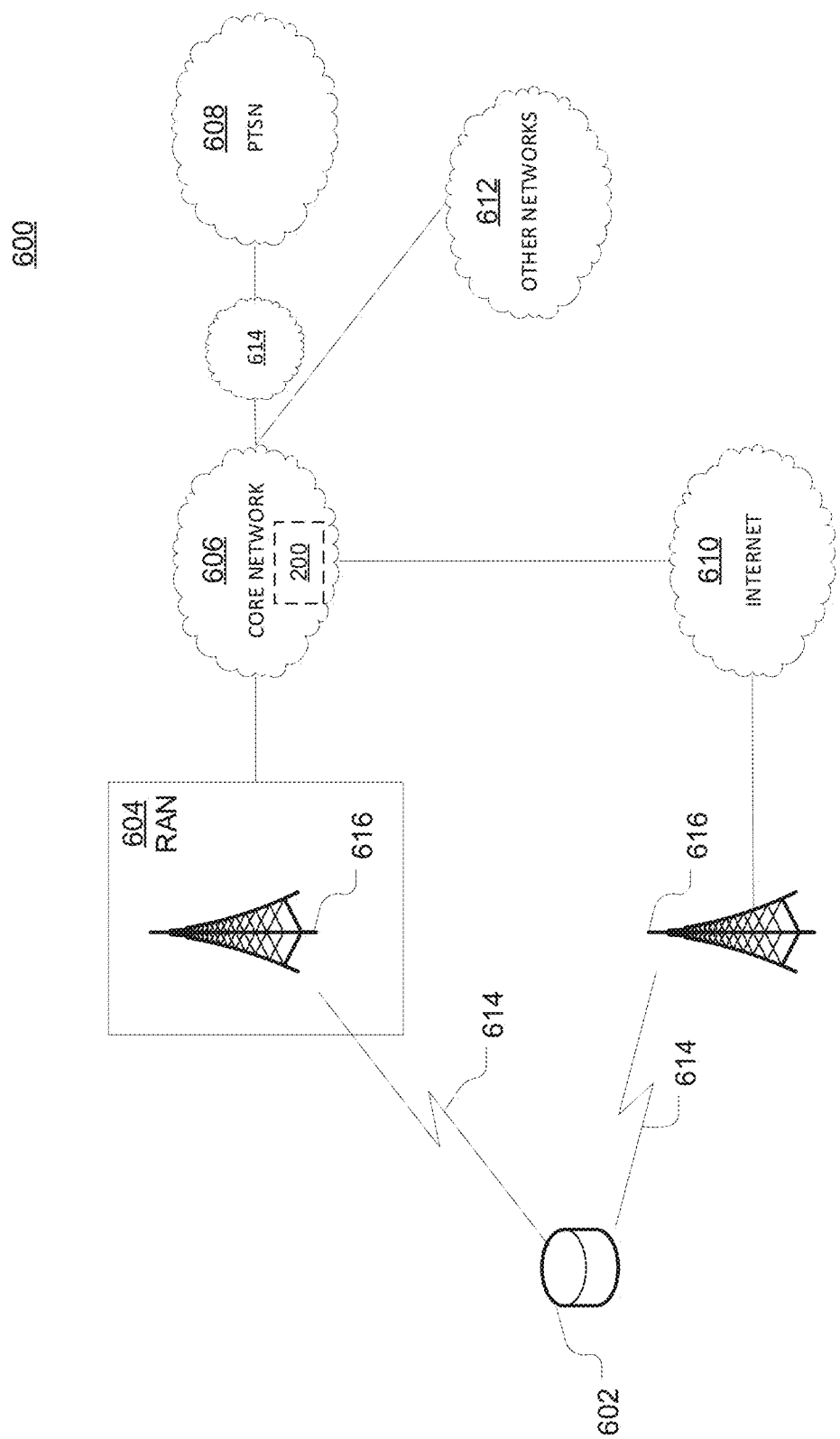
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
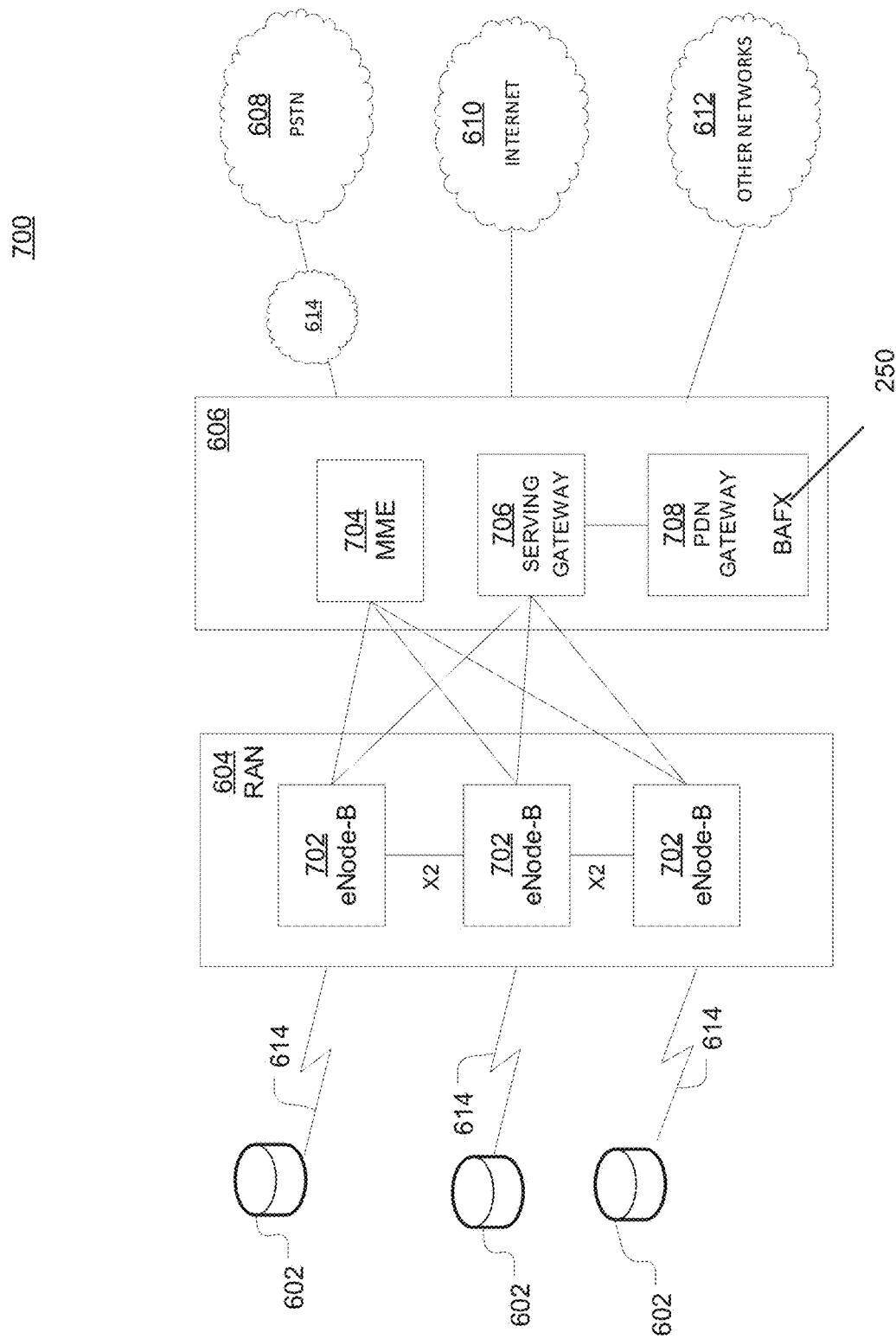
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
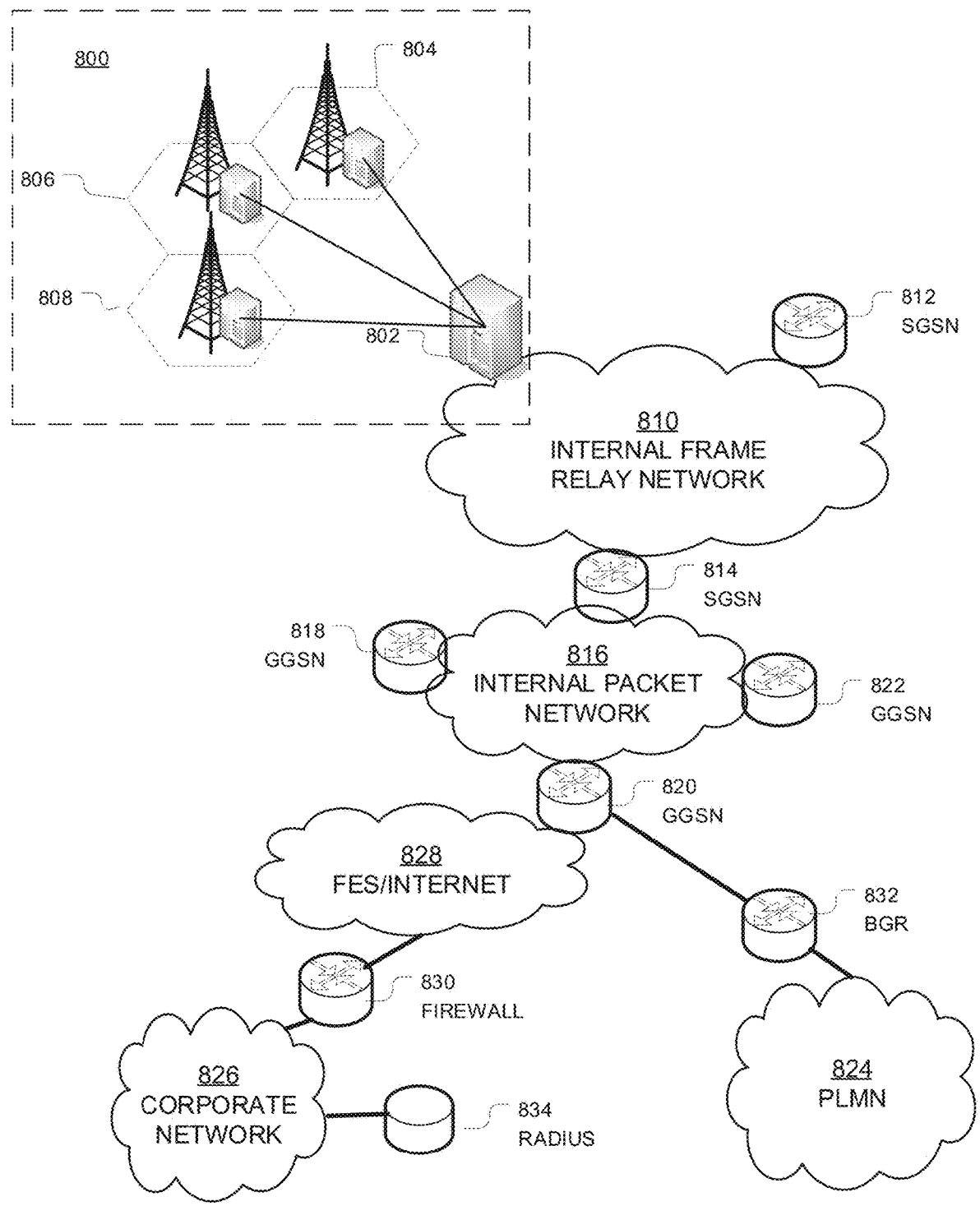
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822, As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
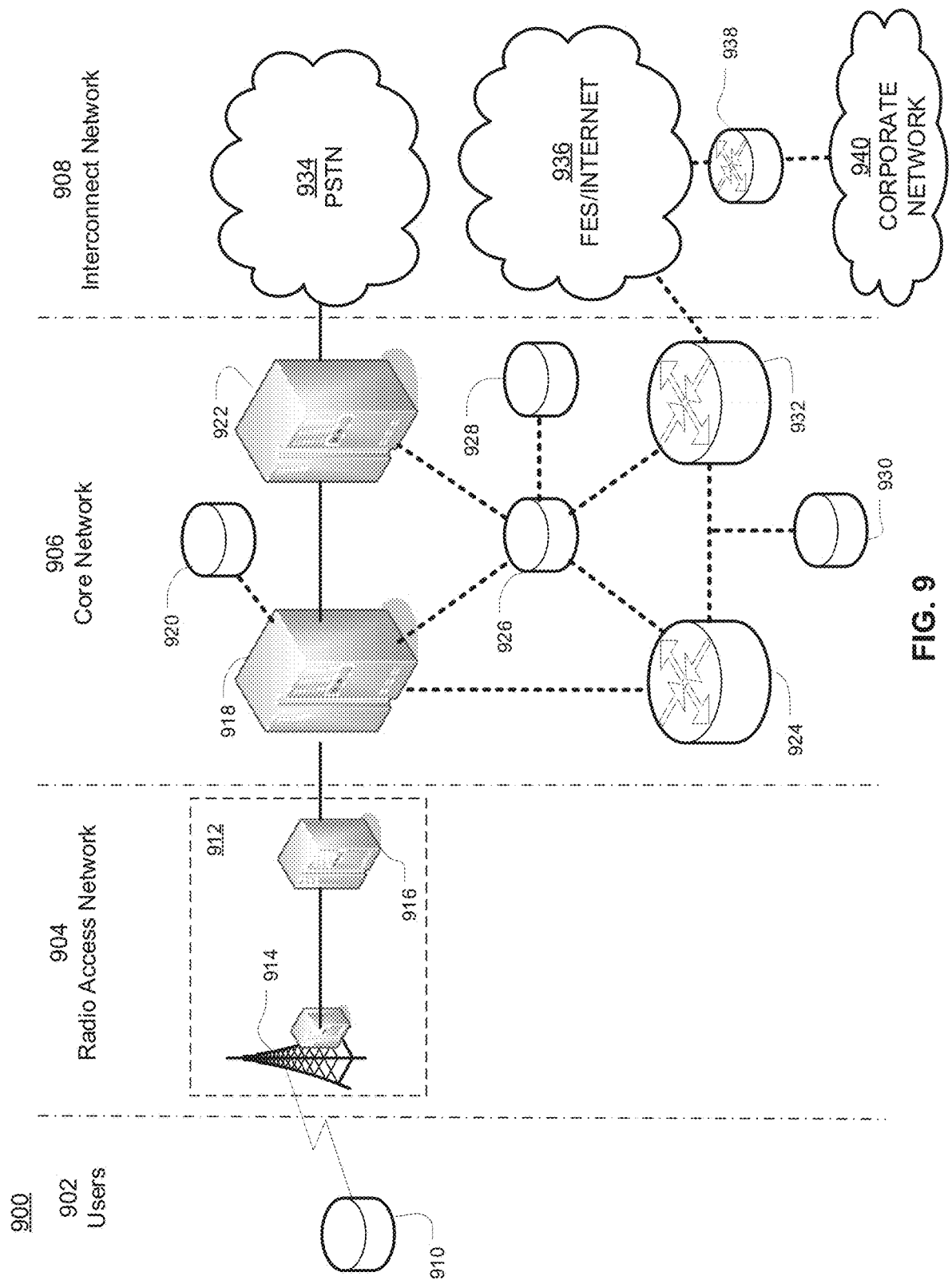
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038 (FIG. 10), or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
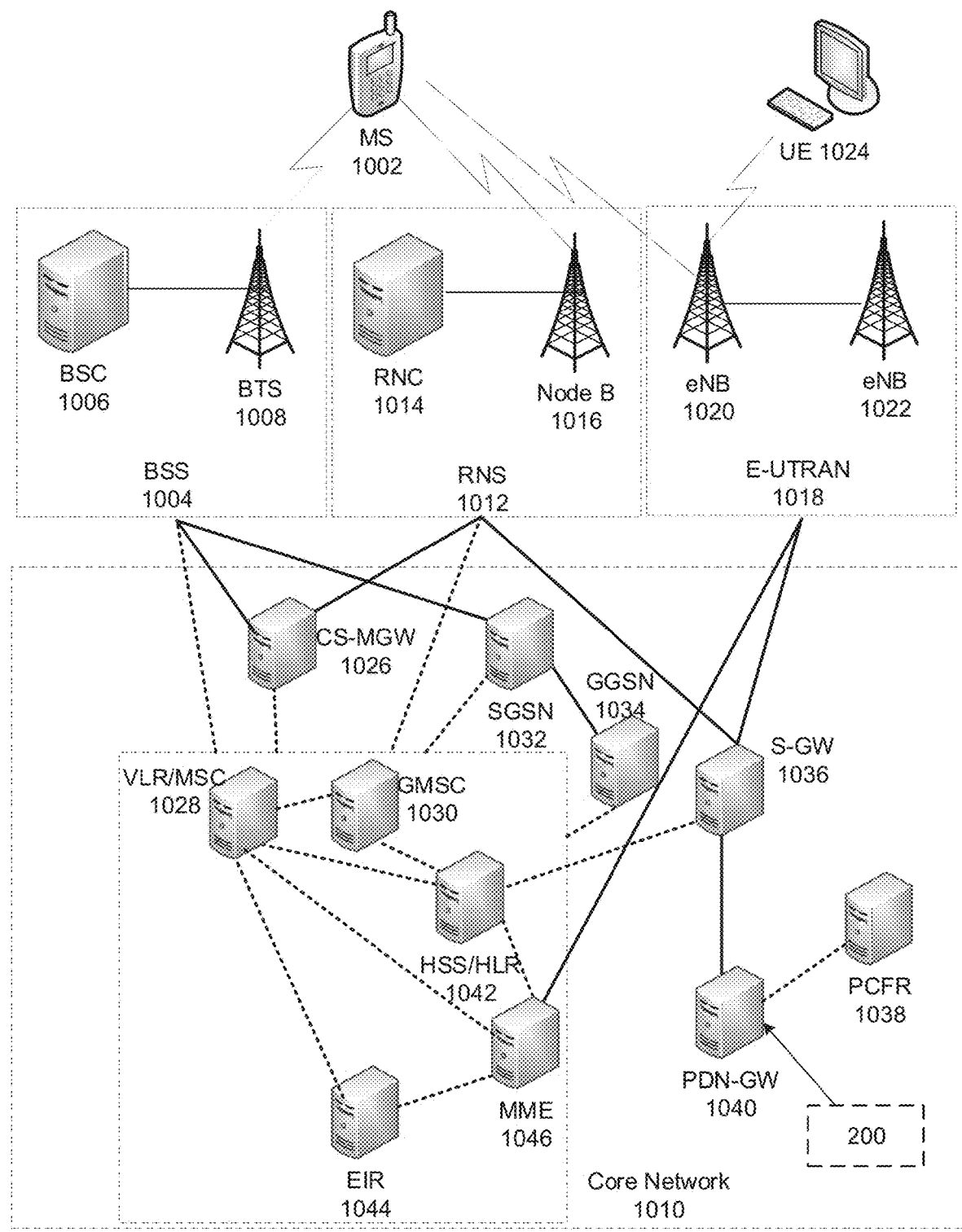
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

As described herein, virtual machines (VMs) can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable. Indeed, virtual machines can be hardware-independent, and can be portably provisioned and deployed on one of multiple different computing devices, operating systems, and environments. Indeed, depending on the availability of computing devices within a cloud environment (e.g., server 104) a particular VM 105 may be provisioned on any one (or multiple) of the devices included in a cloud environment.

In some instances, a virtual machine manager, or hypervisor, may be provided in connection with a cloud computing system (or other system hosting virtual infrastructure). Virtual machine managers may be implemented as software- or hardware-based tools used in the virtualization of hardware assets on one or more host computing devices (e.g., server). A virtual machine manager may be used to run multiple virtual machines, including virtual machines with different guest operating systems, on one or more host computers. The virtual machine manager may provide a shared virtual operating platform for multiple virtual appliances and guest operating systems and enable a plurality of different virtual machines (and guest operating systems) to be instantiated and run on computing devices and hardware hosting virtual infrastructure. Further, virtual machine managers, in some instances may be run natively, or as "bare metal," directly on host computing devices' hardware to control the hardware and to manage virtual machines provisioned on the host devices. In other instances, "hosted" virtual machine managers may be provided that is run within the operating system of another host machine, including conventional operating system environments. Although virtual machine is discussed, the methods systems are applicable to applications in more than one operating system environment. Lastly, virtual component can be programmed to perform application specific functions that may be associated with microcontroller, sensor, motors, actuators, lighting, or radio frequency identification (RFID).

While examples of a telecommunications system in which overload conditions can be processed and managed have been described in connection with various computing devices/processors, the underlying concepts may be applied to any computing device, processor, or system capable of facilitating various networks. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a network and underlying telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

Experiment:

According to the examples above, an overload system was tested and the following experimental results obtained. This experiment should not be considered limiting. As discussed above, the ability to oversubscribe relies on two primary enablers: 1) that VMs do not use/grow to use requested vCPUs; and 2) that VMs have different behaviors in terms of utilization, i.e. they do not peak at the same time. The following experiment was conducted to assess the effect of oversubscription and act on it. A model that was at the same time sufficiently accurate and general to capture the above enablers was developed using a multivariate stochastic process. The model included a multivariate normal distribution:

$$X_t = (X_t^{[1]}, X_t^{[2]}, \ldots, X_t^{[M]}) \sim N(\mu_t, \Sigma)$$

as described above. A least squares estimator was used to determine $\mu_t$ as follows:

$$\hat{\mu} = \hat{\alpha}t + \hat{\beta}$$

$$\hat{\alpha}_i = \frac{(\tau_c - \tau_s + 1)\sum_{t=\tau_s}^{\tau_c} t x_t^{[i]} - \sum_{t=\tau_s}^{\tau_c} x_t^{[i]} \sum_{t=\tau_s}^{\tau_c} t}{(\tau_c - \tau_s + 1)\sum_{t=1}^{\tau_c} t^2 - \left(\sum_{t=\tau_s}^{\tau_c} t\right)^2},$$

-continued for $1 \leq i \leq M$ $$\hat{\beta}_i = \frac{\sum_{t=\tau_s}^{\tau_c} x_t^{[i]} - \hat{\alpha}_i \sum_{t=\tau_s}^{\tau_c} t}{\tau_c - \tau_s + 1}$$

Parameter $\Sigma$ was estimated using a covariance estimator as follows:

$$\hat{\Sigma}_{(j,k)} = \frac{\sum_{t=\tau_s}^{\tau_c} x_t^{[j]} x_t^{[k]}}{\tau_c - \tau_s + 1} - \frac{\hat{\alpha}_j \sum_{t=\tau_s}^{\tau_c} t x_t^{[k]} + \hat{\beta}_j \sum_{t=\tau_s}^{\tau_c} x_t^{[k]}}{\tau_c - \tau_s + 1} - \frac{\hat{\alpha}_k \sum_{t=\tau_s}^{\tau_c} t x_t^{[j]} + \hat{\beta}_k \sum_{t=\tau_s}^{\tau_c} x_t^{[j]}}{\tau_c - \tau_s + 1} + \frac{\hat{\alpha}_j \hat{\alpha}_k \sum_{t=\tau_s}^{\tau_c} t^2 + (\hat{\alpha}_j \hat{\beta}_k + \hat{\alpha}_k \hat{\beta}_j) \sum_{t=\tau_s}^{\tau_c} t + \hat{\beta}_j \hat{\beta}_k (\tau_c - \tau_s + 1)}{\tau_c - \tau_s + 1},$$

for $1 \leq j, k \leq M$,

The sums involving t were computed using closed form formulas. Moreover, the sums can be computed by only updating the sums at each step without the need to consider a past value to compute each time. According to an example, host ewr2r26c018.ewr2.cci.att.com was considered for a selected time Ts. The experimentally obtained data depicted in FIGS. 11A-11D showed an oversubscription ratio of 78/48 or 162.5%.

Using the above data, a probability of overload was calculated for various times in the future, as shown in FIG. 11E.

Experiment:

According to the examples above, an overload system was simulated and the following experimental results obtained. This experiment should not be considered limiting. As discussed above, the ability to oversubscribe relies on two primary enablers: 1) that VMs do not use/grow to use requested vCPUs; and 2) that VMs have different behaviors in terms of utilization, i.e. they do not peak at the same time. The following experiment was conducted to assess the effect of oversubscription and act on it. A model that was at the same time sufficiently accurate and general to capture the above enablers was developed using a multivariate stochastic process. The model included in the experiment is based on the fast-to-estimate V-ARMA model example above where at each instance of time the CPU loads of the VMs of a host are modeled as a multivariate normal distribution:

$$X_t \equiv (X_t^{[1]}, X_t^{[2]}, \ldots, X_t^{[M]}) \sim N(\mu_t, \Sigma)$$

as described above. The model parameter estimator in this experiment utilizes a least squares estimator to determine $\mu_t$ as follows:

$$\hat{\mu}_t = \hat{\alpha} t + \hat{\beta}$$

$$\hat{\alpha}_i = \frac{(\tau_c - \tau_s + 1) \sum_{t=\tau_s}^{\tau_c} t x_t^{[i]} - \sum_{t=\tau_s}^{\tau_c} x_t^{[i]} \sum_{t=\tau_s}^{\tau_c} t}{(\tau_c - \tau_s + 1) \sum_{t=1}^{\tau_c} t^2 - \left(\sum_{t=\tau_s}^{\tau_c} t\right)^2},$$

for $1 \leq i \leq M$ $$\hat{\beta}_i = \frac{\sum_{t=\tau_s}^{\tau_c} x_t^{[i]} - \hat{\alpha}_i \sum_{t=\tau_s}^{\tau_c} t}{\tau_c - \tau_s + 1}$$

Figure 12:
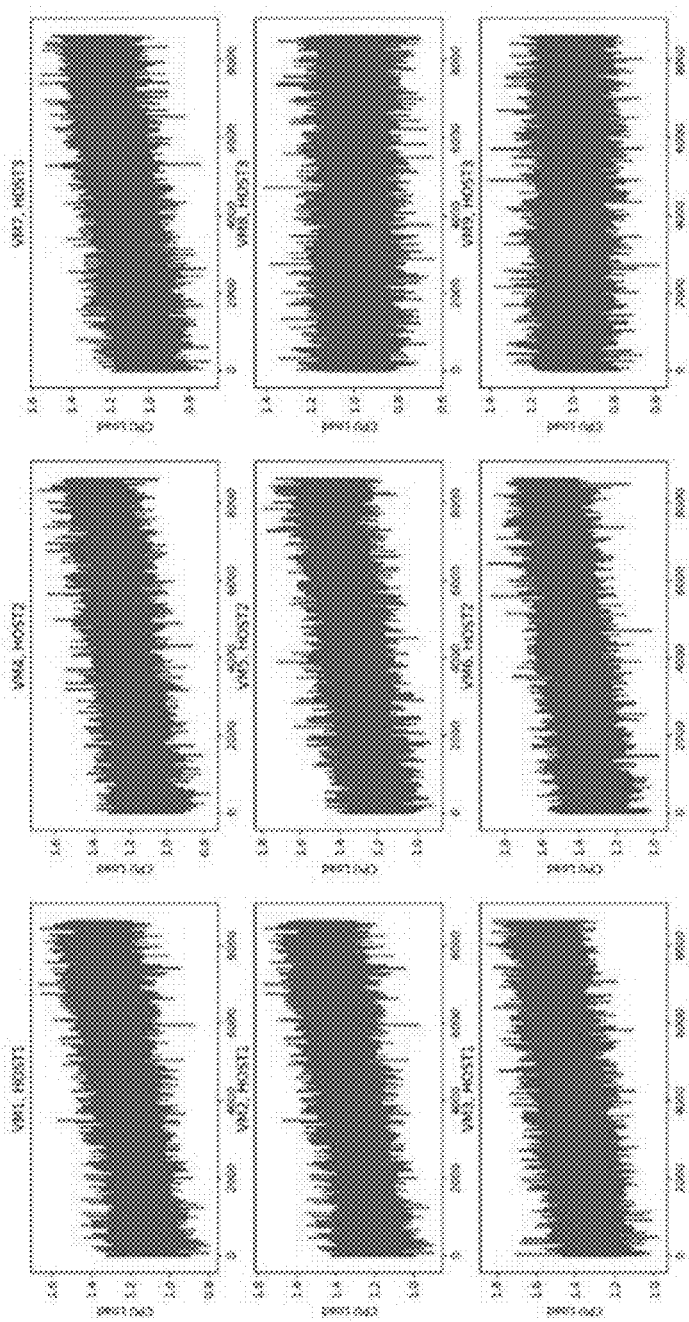
FIG. 12 is a plot of randomly generated CPU loads in an experiment.

Parameter $\Sigma$ is estimated using a covariance estimator as follows:

$$\hat{\Sigma}_{(j,k)} = \frac{\sum_{t=\tau_s}^{\tau_c} x_t^{[j]} x_t^{[k]}}{\tau_c - \tau_s + 1} - \frac{\hat{\alpha}_j \sum_{t=\tau_s}^{\tau_c} t x_t^{[k]} + \hat{\beta}_j \sum_{t=\tau_s}^{\tau_c} x_t^{[k]}}{\tau_c - \tau_s + 1} - \frac{\hat{\alpha}_k \sum_{t=\tau_s}^{\tau_c} t x_t^{[j]} + \hat{\beta}_k \sum_{t=\tau_s}^{\tau_c} x_t^{[j]}}{\tau_c - \tau_s + 1} + \frac{\hat{\alpha}_j \hat{\alpha}_k \sum_{t=\tau_s}^{\tau_c} t^2 + (\hat{\alpha}_j \hat{\beta}_k + \hat{\alpha}_k \hat{\beta}_j) \sum_{t=\tau_s}^{\tau_c} t + \hat{\beta}_j \hat{\beta}_k (\tau_c - \tau_s + 1)}{\tau_c - \tau_s + 1},$$

for $1 \leq j, k \leq M$,

The sums involving t were computed using closed form formulas. Moreover, the sums can be computed by only updating the sums at each step without the need to consider a past value to compute each time. The experiment includes 3 hosts, Host1-Host3, where each host is running 3 VMs. Host1 is running VM1-VM3, Host2 is running VM4-VM6, and Host3 is running VM7-VM9. Each of the hosts has a capacity of 6 vCPUs and each of the VMs is allocated 3 vCPUs, an oversubscription ratio of 1.5. FIG. 12 is the randomly generated CPU loads for all 9 VMs with the horizontal axes showing the index of the 5-min intervals over the 30 days starting from index 0:

Using the above time series simulated measurements, the model parameter estimator was able to estimate the parameters of the non-stationary mean as:

|     | $\hat{\alpha}$ | $\hat{\beta}$ |
| --- | --- | --- |
| VM1 | 3.03E−05 | 1.100843 |
| VM2 | 3.03E−05 | 1.200843 |
| VM3 | 2.98E−05 | 1.299797 |
| VM4 | 2.99E−05 | 1.100034 |
| VM5 | 2.97E−05 | 1.203461 |
| VM6 | 3.04E−05 | 1.297969 |
| VM7 | 3.00E−05 | 0.99992 |
| VM8 | 2.60E−07 | 0.997921 |
| VM9 | −6.96E−08 | 0.998057 |

| VM1 | VM2 | VM3 | VM4 | VM5 | VM6 | VM7 | VM8 | VM9 |

| | | | | | | | | | |
|---|---|---|---|---|---|---|---|---|---|
| VM1 | 0.009503502 | 0.009504 | 0.000136 | 5.42E−05 | 0.000165 | −1.44E−05 | 0.000124 | −3.81E−05 | 5.18E−05 |
| VM2 | 0.009503502 | 0.009504 | 0.000136 | 5.42E−05 | 0.000165 | −1.44E−05 | 0.000124 | −3.81E−05 | 5.18E−05 |
| VM3 | 0.000136393 | 0.000136 | 0.010106 | 3.10E−05 | −4.91E−05 | −7.39E−06 | 8.83E−05 | −0.00013 | 1.15E−05 |
| VM4 | 5.42E−05 | 5.42E−05 | 3.10E−05 | 0.010018 | 0.00018 | −2.80E−05 | −0.00012 | 4.87E−06 | 2.92E−05 |
| VM5 | 0.000164607 | 0.000165 | −4.91E−05 | 0.00018 | 0.010005 | 0.000108 | −4.03E−05 | −1.41E−05 | 8.05E−05 |
| VM6 | −1.44E−05 | −1.44E−05 | −7.39E−06 | −2.80E−05 | 0.000108 | 0.009885 | 0.000162 | −7.20E−05 | 6.75E−05 |
| VM7 | 0.000124277 | 0.000124 | 8.83E−05 | −0.00012 | −4.03E−05 | 0.000162 | 0.010122 | 8.85E−05 | 0.000119 |
| VM8 | −3.81E−05 | −3.81E−05 | −0.00013 | 4.87E−06 | −1.41E−05 | −7.20E−05 | 8.85E−05 | 0.010023 | 5.93E−05 |
| VM9 | 5.18E−05 | 5.18E−05 | 1.15E−05 | 2.92E−05 | 8.05E−05 | 6.75E−05 | 0.000119 | 5.93E−05 | 0.0099 |

Note that only VM1 and VM2 exhibit a covariance higher than 0.001. Using the above parameters that the model parameter estimator estimated, the load assessment module finds the probability distribution of the sum of the CPU loads on each host and calculates the probability of being available on each of the hosts after 30 days in the future as:

| | |
|---|---|
| Probability Host1 available | 0.999923612 |
| Probability Host2 available | 0.999999339 |
| Probability Host3 available | 1 |

The load assessment module communicates the above probabilities to the overload detector which compares them to the availability requirements of the SLAs of the VMs on the hosts. Assuming that all VMs have an availability requirement of 99.999% (5 9's), then the overload detector (also assuming that the probability that the host goes down is zero) will decide that Host 1 is predicted to be overloaded. This decision is communicated in turn to the recommender.

The recommender then hypothetically removes each of VM1, VM2, and VM3 from Host1 one at a time and recalculates the probability of being available as:

| | |
|---|---|
| Probability Host1 available after removing VM1 | 1 |
| Probability Host1 available after removing VM2 | 1 |
| Probability Host1 available after removing VM3 | 1 |

The recommender finds that all 3 VMs are good candidates for being shut-down or migrated, then it picks VM1 arbitrarily. Afterwards, the recommender hypothetically places VM1 on each of Host2 and Host3 and recalculates the probability that Host2 and Host3 are available:

| | |
|---|---|
| Probability Host2 available after adding VM1 | 5.04E−05 |
| Probability Host3 available after adding VM1 | 0.999990158 |

Since only Host3 has a probability of being available above 5 9's, the recommender decides that VM1 can be migrated to Host3. It is worth nothing that, if complexity and delay are not an issue, the recommender can take a more optimized decision if it considers the migration of each of VM1 or VM2 or VM3 to any of the hosts. Finally, the recommender outputs the 3 following messages: (1) Host1 is overloaded (2) VM1 or VM2 or VM3 are candidates for shutdown, VM1 picked (3) For migration instead of shutdown, VM1 can be migrated to Host3.

EXAMPLES

Example 1

A cloud oversubscription system comprising an overload detector configured to model a time series of data of at least one virtual machine on a host as a vector-valued stochastic process including at least one model parameter, the overload detector communicating with an inventory database, the overload detector configured to obtain an availability requirement for each of the at least one virtual machine; a model parameter estimator communicating with the overload detector, the model parameter estimator communicating with a database containing resource measurement data for at least one virtual machine on a host at a selected time interval, the model parameter estimator is configured to estimate the at least one model parameter from the resource measurement data; a loading assessment module communicating with the model parameter module to obtain the at least one model parameter for each of the at least one host running at least one virtual machine and determine a probability of overload based on the at least one model parameter, wherein the loading assessment module communicates the probability of overload to the overload detector; wherein the overload detector compares the probability of overload to the availability requirement to identify a probable overload condition value; and wherein the overload detector communicates the probable overload condition value to a recommender, wherein the recommender generates an alert when the overload condition value exceeds the service level agreement requirements for any of the at least one virtual machine.

Example 2

The system of example 1, wherein the recommender identifies an overloading virtual machine from the at least one virtual machine and takes an action to resolve the overload condition value.

Example 3

The system of example 2, wherein the action includes migrating the virtual machine to another physical host or disabling the virtual machine.

Example 4

The system of example 1, wherein the model parameter estimator is configured to estimate the at least one parameter according to a vector-valued stochastic process model applying a recursive parameter estimation.

Example 5

The system of example 4, wherein the stochastic process model is a Vector Auto Regressive Moving Average model with a non-stationary mean.

Example 6

The system of example 1, wherein the load assessment module is configured to communicate with the model parameter estimator to obtain the model parameters, to find the probability distribution of the sum of the vector-values at a time instance of the stochastic process, and to determine the probability of overload of each of at least one host.

Example 7

The system of example 1, wherein the overload detector is configured to identify a most stringent availability requirement from the availability requirement of each of the at least one virtual machine and compare the probability of overload to the most stringent requirement.

Example 8

The system of example 1, wherein the overload detector is configured to obtain a probability of the host being down from the inventory database, and wherein the overload detector is configured to consider the probability of overload and the probability of the host being down in comparison to the availability requirement.

Example 9

The system of example 8, wherein the overload detector is configured to consider whether the sum of the probability of overload and the probability of the host being down is less than a one minus the maximum availability value from the availability value obtained for each of the at least one virtual machine.

Example 10

The system of example 1, wherein the recommender is configured to model at least one candidate virtual machine on a second host to determine the probability of overload for the candidate virtual machine and the second host; and wherein the recommender migrates the candidate virtual machine having a least impact on the probability of overload for the second host to the second host.

Example 11

A method for determining an overload condition for a host in a cloud computing environment, the method comprising measuring a loading value of a virtual machine assigned to a host; periodically storing the loading value in a database; performing a recursive parameter estimation including at least one summation using the loading values within the database; updating the at least one summation at a selective time interval and storing a value of the at least one summation at each selective time interval estimating a probability of overload by: a) finding the distribution of the at least one summation at a current time and at least one future time, b) finding the probability of overload using estimated model parameters of vector valued-stochastic process model and a capacity of the physical host; comparing the probability of overload to an expected availability value; and recommending an action to take if expected availability value is violated.

Example 12

The method of example 11, wherein the step of recommending includes a) identifying a candidate virtual machine to migrate based on the estimated model and new probability of overload b) finding the probability of overload for a second physical host if the candidate virtual machine is migrated to the alternate physical host;

c) when the alternate physical host can accept the candidate virtual machine and satisfy without violating the expected availability value, migrating the candidate virtual machine to the second physical host.

Example 12

The method of example 11, wherein the step of recommending includes a) identifying a candidate virtual machine to migrate based on the estimated model and new probability of overload; b) finding the probability of overload for a second physical host if the candidate virtual machine is migrated to the alternate physical host; and c) when the alternate physical host can accept the candidate virtual machine and satisfy without violating the expected availability value, migrating the candidate virtual machine to the second physical host.

Example 13

A network device comprising a process, a memory coupled with the processor, and an input/output device, the memory comprising executable instructions that when executed by the processor cause the processor to effectuate operations comprising modeling a time series of data for each of at least one host running at least one virtual machine as a vector including at least one model parameter; obtaining a resource measurement data for each virtual machine on the host at a selected time interval and estimating the at least one model parameter from the resource measurement data; determining a probability of overload based on the at least one model parameter for each of the at least one host; obtaining an availability requirement and comparing the probability of overload to the availability requirement; and taking an action where the probability of overload violates the availability requirement.

Example 14

The network device of example 13, wherein the action comprises at least one of generating an alert via the input/output device; terminating one of the at least one virtual machine; and migrating one of the at least one virtual machine to a second host.

Example 15

The network device of example 13, wherein the action includes further operations comprising identifying a candidate virtual machine from the at least one virtual machine by iteratively removing each virtual machine from the modeling to determine which virtual machine has the greatest impact on the probability of overload.

Example 16

The network device of example 15 further comprising operations comprising modeling the candidate virtual machine on at least one second host to determine a probability of overload on the second host; comparing the probability of overload on the second host to an availability requirement for the second host; and when the probability of overload on the second host does not violate the availability requirement on the second host, migrating the candidate virtual machine to the second host.

Example 17

The network device of example 13, wherein the operation of estimating the model parameters includes performing a recursive parameter estimation including at least one summation based on the network resource data; updating the at least one summation at a selected time interval; storing the parameters for each time interval in the memory.

Example 18

The network device of example 17 wherein the step of determining includes finding the distribution of the at least one summation at a current time and a future time.

Example 19

The network device of example 18, wherein the step of determining includes finding the probability of overload using the vector-valued stochastic process model parameters and a capacity of the host.

Example 20

The network device of example 13, wherein the availability requirement is included in at least one of a virtual machine service level agreement requirements.

The invention claimed is:

1. A cloud oversubscription system comprising:
an overload detector configured to model a time series of data of at least one virtual machine on a host as a vector-valued stochastic process including at least one model parameter, the overload detector communicating with an inventory database, the overload detector configured to obtain an availability requirement for each of the at least one virtual machine;
a model parameter estimator communicating with the overload detector, the model parameter estimator communicating with a database containing resource measurement data for at least one virtual machine on a host at a selected time interval, the model parameter estimator is configured to estimate the at least one model parameter from the resource measurement data;
a loading assessment module communicating with the model parameter estimator to obtain the at least one model parameter for the host running the at least one virtual machine and determine a probability of overload based on the at least one model parameter, wherein the loading assessment module communicates the probability of overload to the overload detector;
wherein the overload detector compares the probability of overload to the availability requirement to identify a probable overload condition value;
wherein the overload detector communicates the probable overload condition value to a recommender, wherein the recommender generates an alert when the probable overload condition value exceeds service level agreement requirements for any of the at least one virtual machine;
wherein the overload detector is configured to obtain a probability of the host being down from the inventory database, and wherein the overload detector is configured to consider the probability of overload and the probability of the host being down in comparison to the availability requirement; and
wherein the overload detector is configured to consider whether a sum of the probability of overload and the probability of the host being down is less than a one minus a maximum availability value from an availability value obtained for each of the at least one virtual machine.

2. The system of claim 1, wherein the recommender identifies an overloading virtual machine from the at least one virtual machine and takes an action to resolve the overload condition value.

3. The system of claim 2, wherein the action includes migrating the virtual machine to another physical host or disabling the virtual machine.

4. The system of claim 1, wherein the model parameter estimator is configured to estimate the at least one parameter according to a vector-valued stochastic process model applying a recursive parameter estimation.

5. The system of claim 4, wherein the stochastic process model is a Vector Auto Regressive Moving Average with a non-stationary mean.

6. The system of claim 1, wherein the load assessment module is configured to communicate with the model parameter estimator to obtain the model parameters, to find a probability distribution of the sum of vector-values at a time instance of the stochastic process, and to determine the probability of overload of the host.

7. The system of claim 1, wherein the overload detector is configured to identify a most stringent availability requirement from the availability requirement of each of the at least one virtual machine and compare the probability of overload to the most stringent requirement.

8. The system of claim 1, wherein the recommender is configured to model at least one candidate virtual machine on a second host to determine the probability of overload for the candidate virtual machine and the second host; and wherein the recommender migrates the candidate virtual machine having a least impact on the probability of overload for the second host to the second host.

9. A method for determining an overload condition for a host in a cloud computing environment, the method comprising:
measuring a loading value of a virtual machine assigned to the host;
periodically storing the loading value in a database;
performing a recursive parameter estimation including at least one summation using the loading values within the database;
updating the at least one summation at a selective time interval and storing a value of the at least one summation at each selective time interval;
estimating a probability of overload by:
finding a distribution of the at least one summation at a current time and at least one future time, and
finding the probability of overload using estimated model parameters of vector valued-stochastic process model and a capacity of the host;
wherein the vector valued-stochastic process model is configured to obtain a probability of the host being down from an inventory database, and wherein the vector valued-stochastic process model is configured to consider the probability of overload and the probability of the host being down in comparison to an availability requirement, and wherein the vector valued-stochastic process model is configured to consider whether the sum of the probability of overload and the probability of the host being down is less than a one minus the maximum availability value from the availability value obtained for each of the virtual machine;

comparing the probability of overload to an expected availability value; and recommending an action to take if expected availability value is violated.

10. The method of claim 9, wherein the step of recommending includes:
   a) identifying a candidate virtual machine to migrate based on the estimated model and new probability of overload
   b) finding the probability of overload for a second host if the candidate virtual machine is migrated to an alternate host;
   c) when the alternate host can accept the candidate virtual machine and satisfy without violating the expected availability value, migrating the candidate virtual machine to the second host.

11. A network device comprising a processor, a memory coupled with the processor, and an input/output device, the memory comprising executable instructions that when executed by the processor cause the processor to effectuate operations comprising:

modeling a time series of data for each of at least one host running at least one virtual machine as a vector including at least one model parameter;

obtaining a resource measurement data for each virtual machine on the host at a selected time interval and estimating the at least one model parameter from the resource measurement data;

determining a probability of overload based on the at least one model parameter for each of the at least one physical host;

obtaining a probability of the at least one physical host being down from an inventory database;

obtaining an availability requirement and considering the probability of overload and the probability of the at least one physical host being down in comparison to the availability requirement;

considering whether a sum of the probability of overload and the probability of the at least one physical host being down is less than a one minus a maximum availability value from an availability value obtained for each of the at least one virtual machine; and taking an action when the probability of overload violates the availability requirement.

12. The network device of claim 11, wherein the action comprises at least one of generating an alert via the input/output device; terminating one of the at least one virtual machine; and migrating one of the at least one virtual machine to a second host.

13. The network device of claim 11, wherein the action includes further operations comprising:

identifying a candidate virtual machine from the at least one virtual machine by iteratively removing each virtual machine from the modeling to determine which virtual machine has the greatest impact on the probability of overload.

14. The network device of claim 13 further comprising operations comprising:

modeling the candidate virtual machine on at least one second host to determine a probability of overload on the second host; comparing the probability of overload on the second host to an availability requirement for the second host; and when the probability of overload on the second host does not violate the availability requirement on the second host, migrating the candidate virtual machine to the second host.

15. The network device of claim 11, wherein estimating the at least one model parameter includes performing a recursive parameter estimation including at least one summation based on network resource data; updating the at least one summation at a selected time interval; storing the parameters for each time interval in the memory.

16. The network device of claim 15 wherein the step of determining includes finding a distribution of the at least one summation at a current time and a future time.

17. The network device of claim 16, wherein the step of determining includes finding the probability of overload using a vector-valued stochastic process model parameters and a capacity of the host.

18. The network device of claim 11, wherein the availability requirement is included in at least one of a virtual machine service level agreement requirements.

* * * * *